(12) United States Patent
Shimizu et al.

(10) Patent No.: US 6,768,970 B2
(45) Date of Patent: **\*Jul. 27, 2004**

(54) METHOD FOR PROVIDING POWER PLANT MAINTENANCE SERVICES

(75) Inventors: Satoru Shimizu, Hitachi (JP); Tooru Kimura, Hitachi (JP); Yoshio Maruyama, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/458,379

(22) Filed: Jun. 11, 2003

(65) Prior Publication Data

US 2003/0212532 A1 Nov. 13, 2003

Related U.S. Application Data

(63) Continuation of application No. 09/793,947, filed on Feb. 27, 2001, now Pat. No. 6,665,635.

(30) Foreign Application Priority Data

Sep. 22, 2000 (JP) ........................................ 2000-288243

(51) Int. Cl.$^7$ ................................................ G06F 11/00
(52) U.S. Cl. ........................ 702/188; 376/215; 700/287
(58) Field of Search .............................. 702/45, 50, 55, 702/113, 114, 182–185, 187, 188; 376/215–217; 340/3.31, 3.32; 700/9, 32, 83, 287

(56) References Cited

U.S. PATENT DOCUMENTS

| 5,122,976 | A | | 6/1992 | Bellows et al. ............. 702/185 |
| 5,200,744 | A | * | 4/1993 | Hiromoto et al. ........... 340/3.32 |
| 5,270,917 | A | * | 12/1993 | Kimura ........................ 700/82 |
| 5,287,390 | A | * | 2/1994 | Scarola et al. .............. 376/216 |
| 5,311,562 | A | * | 5/1994 | Palusamy et al. ............ 376/215 |
| 5,657,245 | A | | 8/1997 | Hecht et al. ................. 700/287 |
| 5,796,606 | A | * | 8/1998 | Spring ............................ 700/9 |
| 6,499,114 | B1 | | 12/2002 | Almstead et al. ............. 714/25 |
| 6,524,245 | B1 | * | 2/2003 | Rock et al. .................. 600/437 |

FOREIGN PATENT DOCUMENTS

EP          91113945.9       8/1991    ........... G05B/23/02

* cited by examiner

Primary Examiner—Marc S. Hoff
Assistant Examiner—Mohamed Charioui
(74) Attorney, Agent, or Firm—Kenyon & Kenyon

(57) ABSTRACT

An objective is to quickly provide appropriate maintenance services at low costs during routine inspection procedures and/or upon occurrence of abnormal events at thermal power plants or stations.

In a thermal power plant maintenance system comprising a control device 1 for control of operation conditions and process amounts of plant equipment and a maintenance tool 2 operatively linked to the control device 1 via a network 7 for performing maintenance of a controlling controller 11 as built in the control device 1, the system further comprises a remote maintenance device 3 that executes similar functions to those offered by the maintenance tool 2 for bidirectionally transferring plant data along with data concerning the controlling controller 11's status via a communications line 8 between the maintenance tool 2 and the remote maintenance device 3 to thereby provide maintenance services of the thermal power plant of interest.

10 Claims, 22 Drawing Sheets

METHOD FOR PROVIDING POWER PLANT MAINTENANCE SERVICES

CROSS REFERENCE TO RELATED APPLICATIONS

This is a continuation of U.S. application Ser. No. 09/793,947 filed Feb. 27, 2001 now U.S. Pat. No. 6,665,635.

BACKGROUND OF THE INVENTION

1. Field of the Invention

The present invention relates generally to a method for providing thermal power plant maintenance services and, more particularly, to a thermal power plant maintenance service provision method adaptable for use in routine inspection procedures and/or upon occurrence of abnormality or aberrant phenomena.

2. Description of the Prior Art

In thermal power stations or plants, in cases where certain abnormalities occur during routine inspection and/or in the in-use state or alternatively monitoring is especially required in specific events such as upon start-up/shut-down of a unit, some works should be required including but not limited to control system adjustment, searching for a cause(s) of abnormality, making up a countermeasure, and preparation of a search report. Traditionally, in regard to such maintenance services, an engineer working for a manufacturer, who has received a request from a client (thermal power plant), goes to the power plant for complete such tasks in situ.

The prior art suffers from a problem as to the difficulty of expediting the cause research procedure for obstruction recovery when abnormalities occur during operation due to the fact that a time is taken for the maker's engineer to actually arrive at the power station. Another problem faced with the prior art is that the engineer's working at the real cite accompanies extra costs including a visiting expense, resulting in an increase in inspection costs as a whole.

SUMMARY OF THE INVENTION

It is therefore an object of the present invention to provide a new and improved thermal power plant maintenance service providing method capable of offering prompt and adequate maintenance service abilities during routine inspection and upon occurrence of abnormalities at a thermal power station while reducing costs required therefor.

To attain the foregoing object, the present invention provides a thermal power plant maintenance service provision method adaptable for use with a system including a remote maintenance device for execution of functions similar to those offered by a maintenance tool, the method including the step of permitting a maintenance service providing person to makes use of the remote maintenance device as linked to the maintenance tool via communications lines for bidirectionally transferring plant data and data as to a present state of a controlling controller between the maintenance tool and the remote maintenance device to thereby provide thermal power plant maintenance services.

As explained above, according to the present invention, it becomes possible, by comprising remote maintenance apparatus for execution of similar functions to those offered by the maintenance tool while at the same time letting the maintenance service provider employ the remote maintenance apparatus as linked via communications lines to the maintenance tool in the power station, to remotely provide any required maintenance services including but not limited to test data summary and evaluation results during routine inspection procedures and/or search and investigation results in abnormality occurrence events, which in turn makes it possible to provide prompt and proper maintenance services at low costs in routine inspection events and/or abnormality occurrence events, thus enabling improvement in quality of maintenance services.

DESCRIPTION OF THE PREFERRED EMBODIMENTS

One preferred embodiment of the present invention will now be explained with reference to the accompanying drawings below.

Figure 1:
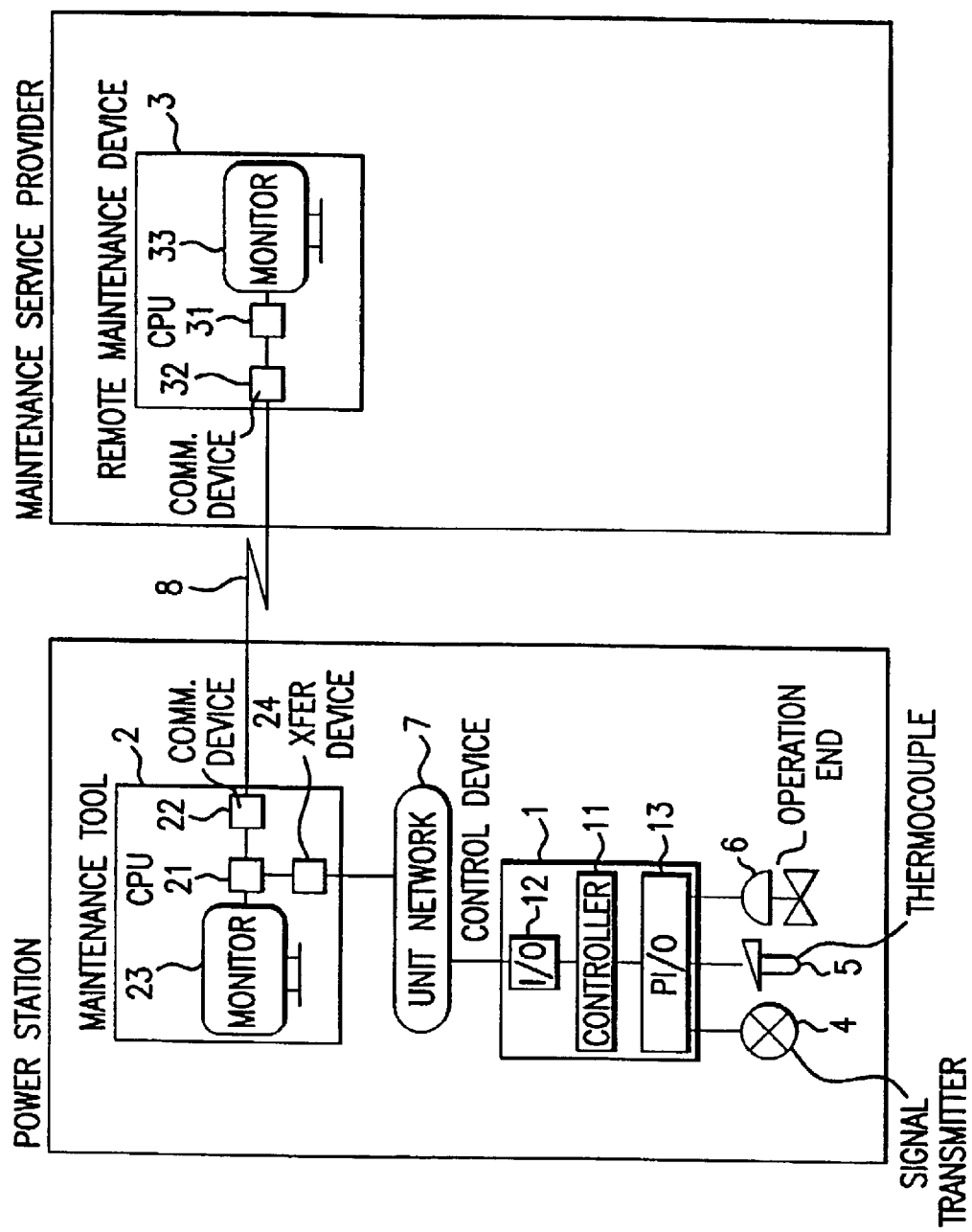
FIG. 1 is a diagram showing an overall configuration of a system for explanation of a thermal power plant maintenance service providing method in accordance with one preferred embodiment of the present invention.

FIG. 1 depicts an overall system configuration for explanation of a thermal power plant service provision method in accordance with one preferred embodiment of the instant invention. This system comprises a power station side facility, which includes a control device 1 containing therein a built-in controlling controller 11 and a process signal input/output device (transfer device) 12, and a maintenance tool 2 for performing maintenance of the control device 1 and data save/storage of process signals or the like, which tool is operatively associated with a signal transmitter 4 and thermocouple 5 for sending forth electrical signals indicative of process amounts such as a pressure and temperature or else toward the control device 1 through a PI/O device 13, an operation end 6 such as a valve and/or a control drive being operatively responsive to receipt of more than one control signal from the control device 1 for controlling the process amounts such as pressure and temperature or the like so that each stays at a prespecified value, wherein the control device 1 and the maintenance tool 2 are operatively connected to each other via a unit network 7. The maintenance tool 2 consists essentially of a central processing device 21, a communication device 22, a monitor 23, and a transfer device 24. Although not specifically depicted in FIG. 1, the unit network 7 is actually connected also to a controlling computer and a CRT operation apparatus or the like for use as an operator's operation terminal in addition to the control device 1 and maintenance tool 2. The system of FIG. 1 also comprises a maintenance service provider side facility, which includes a remote maintenance device 3 with functions for analyzation and editing of data as sent from the maintenance tool 2 on the power station side and those for a variety of kinds of services.

The maintenance tool 2 on the power station side and the remote maintenance device 3 on the maintenance service provider side are operatively connected together via a public communication line 8. The remote maintenance device 3 consists essentially of a central processor device 31, communication device 32, and monitor 33. Optionally the maintenance tool 2 and remote maintenance device 3 may alternatively be connected together via dedicated or "private" communication lines other than public communications lines.

Functionality and operation of each device will next be set forth below.

As shown in FIG. 1, the control device 1 is constituted from the controlling controller 11 and transfer device 12 plus PI/O device 13 and is operable to perform, based on programs prestored in a memory within the controlling controller 11, control processing of process signals indicative of pressures and temperatures as input from the transmitter 4 and thermocouple 5 via the PI/O device 13 and those signals coming from other control devices as input via the transfer device 12 and unit network 7 to thereby output its control processing results toward the operation end 6 through the PI/O device 13 for equipment control or alternatively output such results to other control devices and the maintenance tool 2 via the transfer device 12 and unit network 7.

As shown in FIG. 1 the maintenance tool 2 is configured from the central processor device 21, communication device 22, monitor 23, and transfer device 24.

Figure 2:
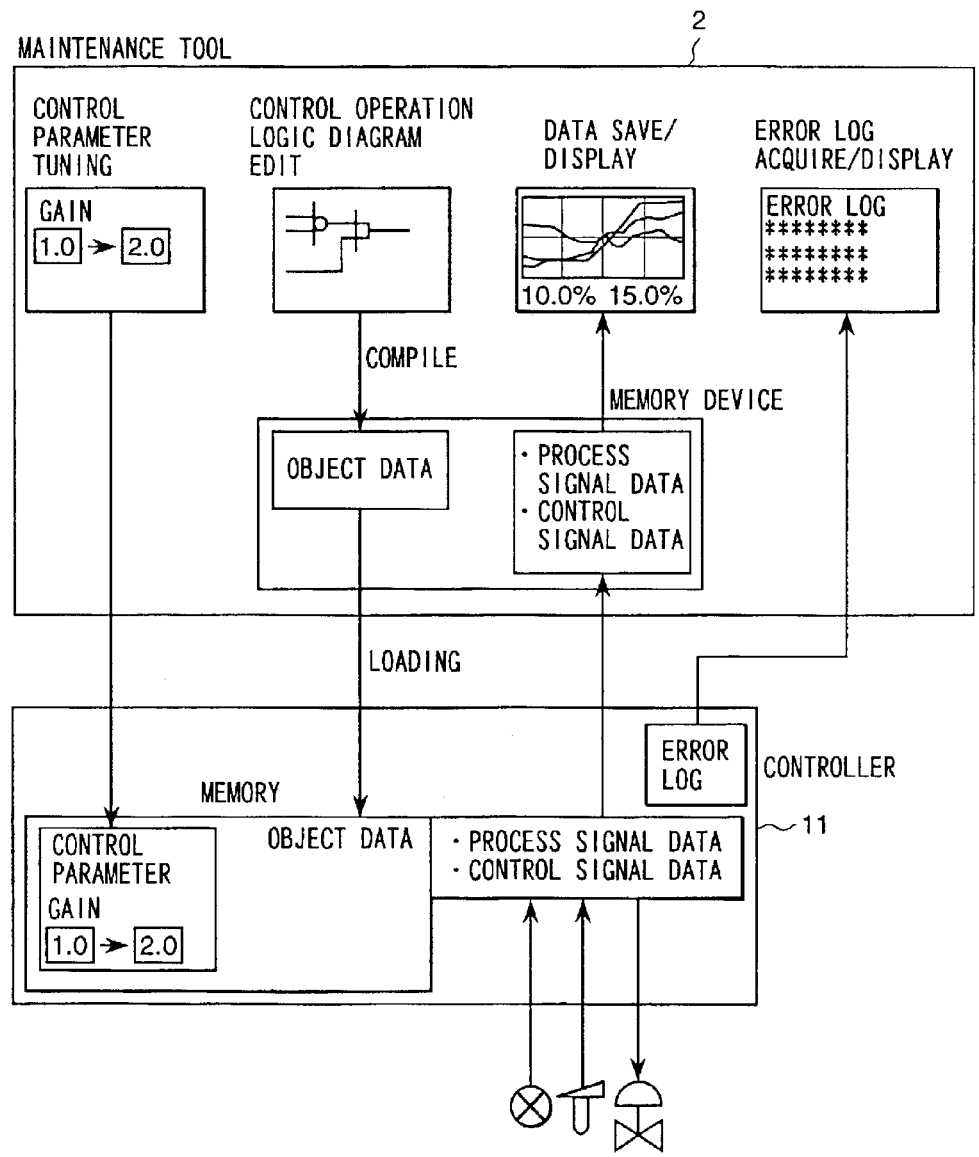
FIG. 2 is a function diagram of a maintenance tool of this invention.

Functionality and operation of the maintenance tool 2 are shown in FIG. 2. At the maintenance tool 2 an input device (not shown) such as a keyboard or a pointing device called "mouse" is used to create and edit a control operation logic chart, wherein drawing data thus produced is compiled to generate object data, which will then be sent via the transfer device 24 and unit network 7 toward the controlling controller 11 within the control device 1 for storage into its built-in memory. In addition, the maintenance tool 2 also has a "parameter online tuning" function for inputting a parameter change instruction through manual operation of the input device such as a keyboard or mouse and then rewriting a control parameter(s) being presently stored in the memory within the controlling controller 11 via the transfer device 24 and unit network 7 in an online fashion. Further, it has a data save/store function capable of inputting a signal being presently output from the control device 1 via the unit network 7 and transfer device 24, temporarily storing the signal in the central processor device 21, and permitting visual on-screen displaying of numeric values and/or trend graphs based on an instruction from the input device such as a keyboard or mouse. Other functions of the maintenance tool 2 include an error log acquisition function for acquiring or fetching error log information as saved within the controlling controller 11 via the unit network 7 and transfer device 24 in the event that a certain operation failure or obstruction takes place in the controlling controller 11. Additionally the communication device 22 is operable to control communications with external equipment over the public communication line 8.

As shown in FIG. 1 the remote maintenance device 3 is structured from the central processor device 31 and communication device 32 plus monitor 33. The remote maintenance device 3 offers similar functionality to that of the maintenance tool 2, thereby allowing a person expected to provide maintenance services-say, maintenance service provider-who is at a remote location spaced far from the power station of interest to remotely execute any one of the functions of the maintenance tool 2 of such power station in a remote control fashion. In addition thereto, the remote maintenance device 3 also has a function for adding any necessary functions to maintenance services.

Figure 3:
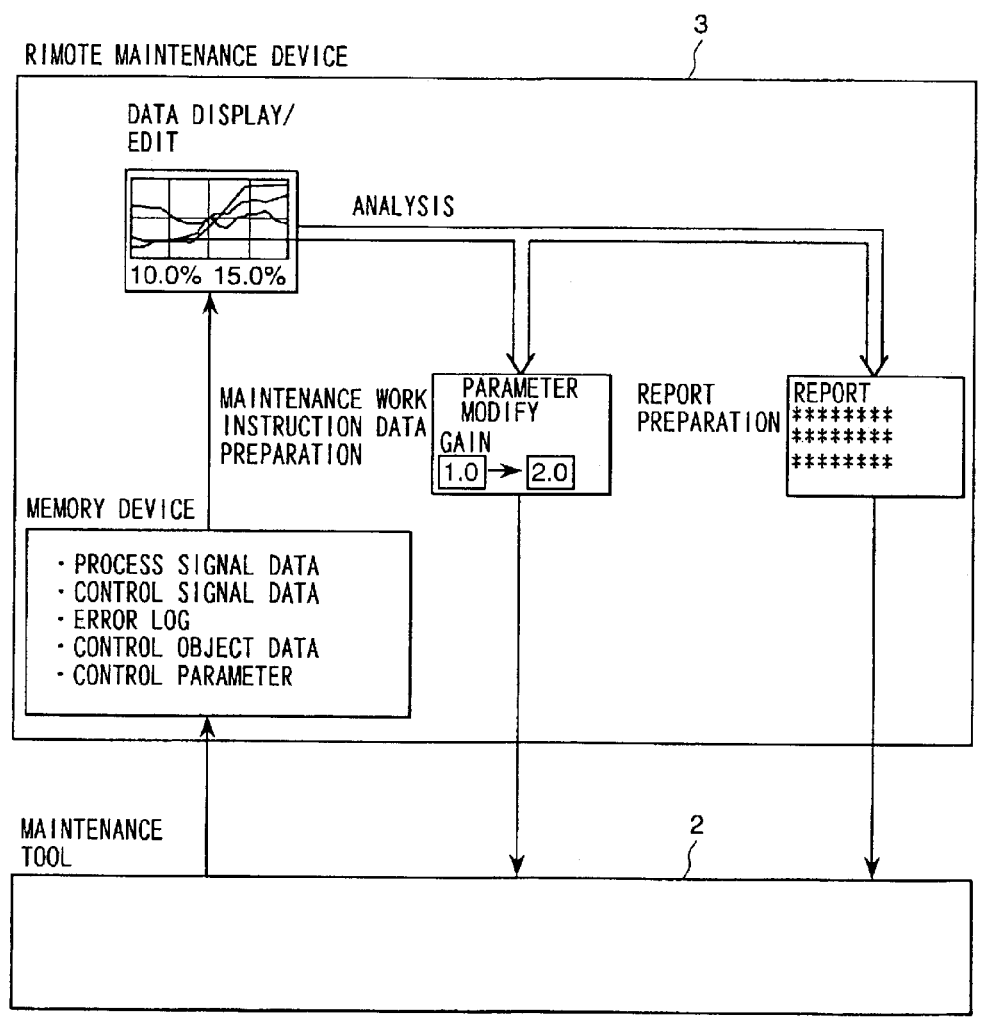
FIG. 3 is a function diagram of a remote maintenance device of the invention.

Functionality and operation of the remote maintenance device 3 are shown in FIG. 3. The remote maintenance device 3 is designed to acquire from the maintenance tool 2 via the public communication line 8 and communication device 32 over communications several data items (process signal data, control signal data, controlling controller error log, controlling controller object data, control parameters, etc.) that the maintenance tool 2 has received from the control device 1 and then save them at a memory device. And it edits and/or processes such data as has been gained from the maintenance tool 2 and saved at the memory device in a way conformity with the content of a maintenance service being presently provided. The maintenance service provider then use the remote maintenance device 3 to thereby provide maintenance services including, but not limited to, analyzing the resultant edited/processed data for preparation of maintenance work instruction data indicative of control parameter modification and/or obstruction recovery works, transmitting the data to the maintenance tool 2 via the communication device 32 and public communication line 8, and preparing a report to send forth report data toward the maintenance tool 2 via the communication device 32 and public communication line 8.

An explanation will next be given of a thermal power plant maintenance service provision method adaptable for use with illustrative embodiment of the invention. With regard to a periodic or "routine" inspection service as one practical example of a first maintenance service, its service provision method will be set forth below.

At thermal power stations, routine inspection must be done at specified constant time intervals as defined under laws and regulations concerned. In routine inspection events, a trial operation known as "test run" is ordinarily carried out in addition to inspection and updating adjustment of the equipment involved. During such test run a variety of tests are done, which typically include a static characteristics test (test for recording and confirming various kinds of process amounts under a constant load condition and then adjusting a control system based on the data thus obtained), dynamic characteristics test (test for recording and verifying the influence of process amount changes upon various process amount and for adjusting the control system based on the resulting data), load change test (test for recording and confirming various process amounts upon changing of the load and for adjusting the control system based on the data). The "routine inspection service" is such that these test data items thus obtained are all taken into consideration for investigation, wherein data analysis and test report preparation are expected to be remotely done by a maintenance service provider.

Figure 4:
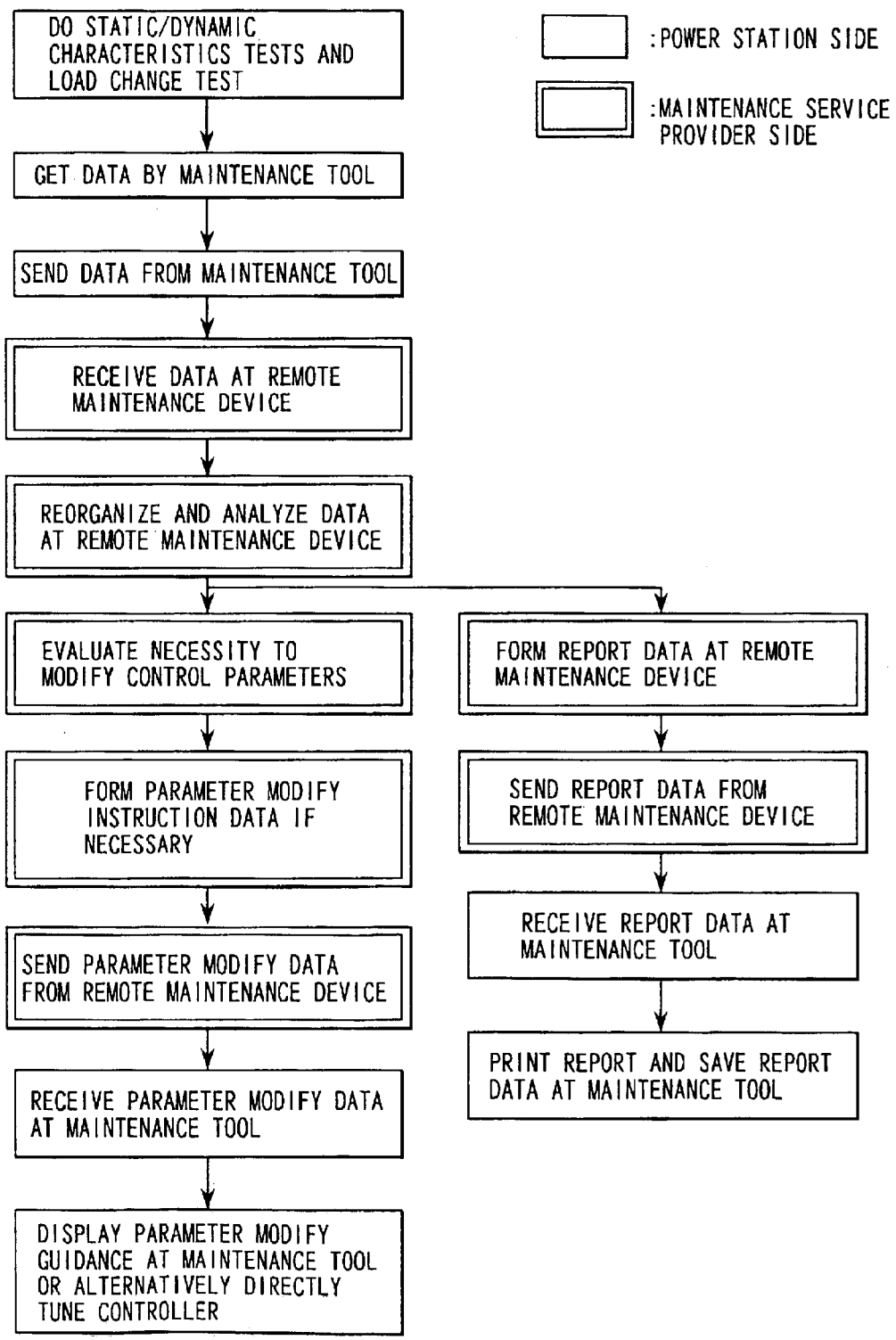
FIG. 4 is a flow diagram of a routine inspection service of the invention.

A method for providing the "routine inspection service" is shown in a flow diagram of FIG. 4. At a power station a various kinds of tests are carried out resulting in acquisition or "sampling" of material process amount data (pressures and temperatures or the like) and control signal data (operation end's instruction values or else) at the maintenance tool 2 in such event. An operator or worker who is expected to act as the maintenance service provider lets the remote maintenance device 3 receive such gained data via the public communication line 8 and store or save the data in the memory device of remote maintenance device 3. The operator then edits and analyzes the stored data at the remote maintenance device 3. Practical contents of major process steps in the flow of FIG. 4 will be explained with reference to FIGS. 5 through 11 below.

Figure 5:
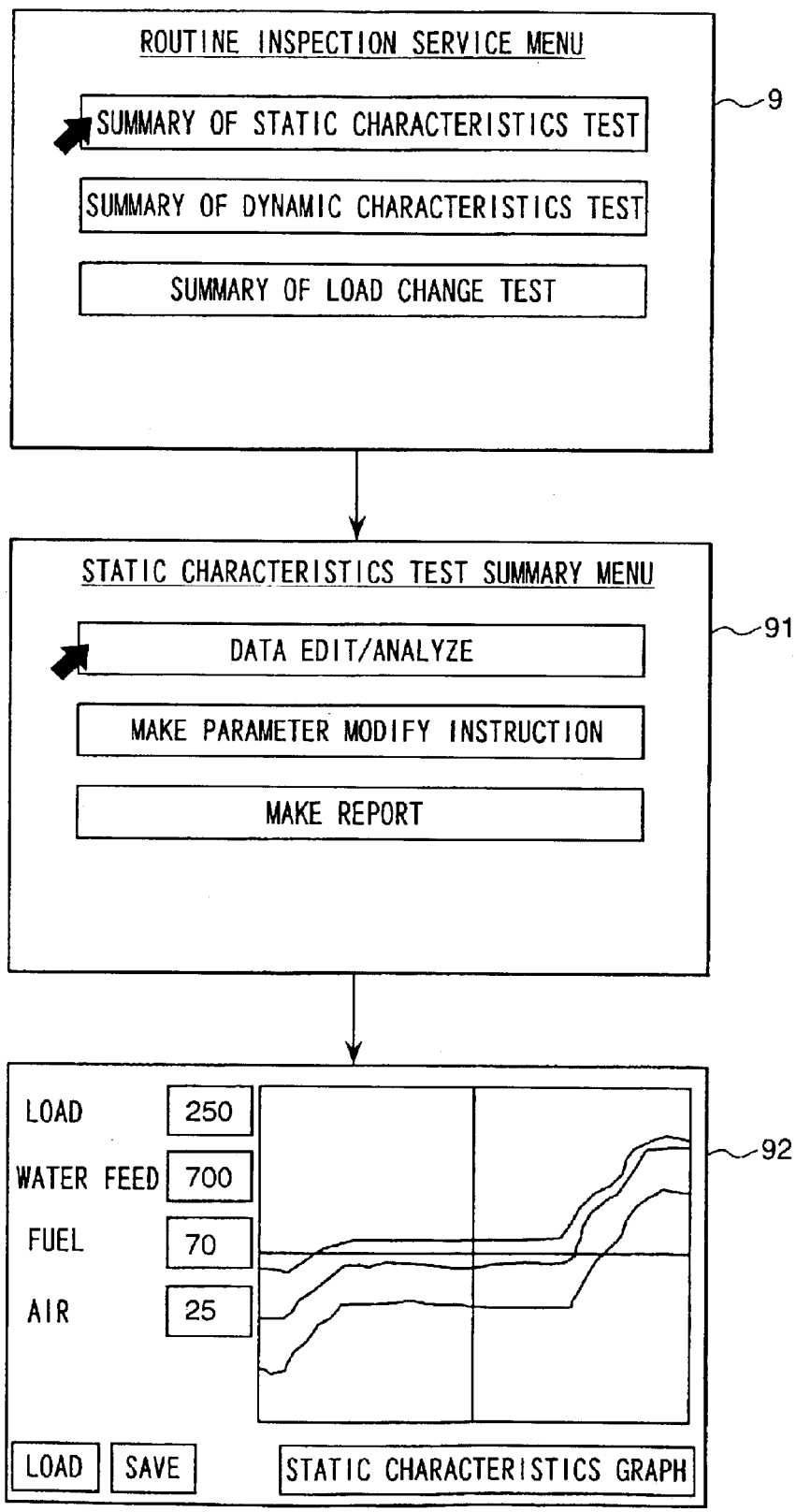
FIG. 5 is a diagram showing a sequence of examples of an operation on-screen display for editing and analysis of static characteristics test data of the invention.

See FIG. 5, which pictorially illustrates a typical example of the sequence of on-screen visual displays for manipulation or operation by the operator-say, "operator console" displays or "operation" displays-to be used during the static characteristics edit/analysis processes at the remote maintenance device 3. When the operator selects an image for use as visual mnemonics or "icon" indicative of "Static Characteristics Summary" in a routine service menu display 9 being presently displayed on the screen of a display unit and then selects "Data Edit/Analysis" on a static characteristics summary menu display 91, the display image changes to visually indicate a static characteristics data edit/analysis display 92. While letting a trend graph of the test data be displayed on this screen, s/he attempts to summarize data as to material parameters which include, inter alia, a fuel amount, water feed amount and air amount at a certain load.

Figure 6:
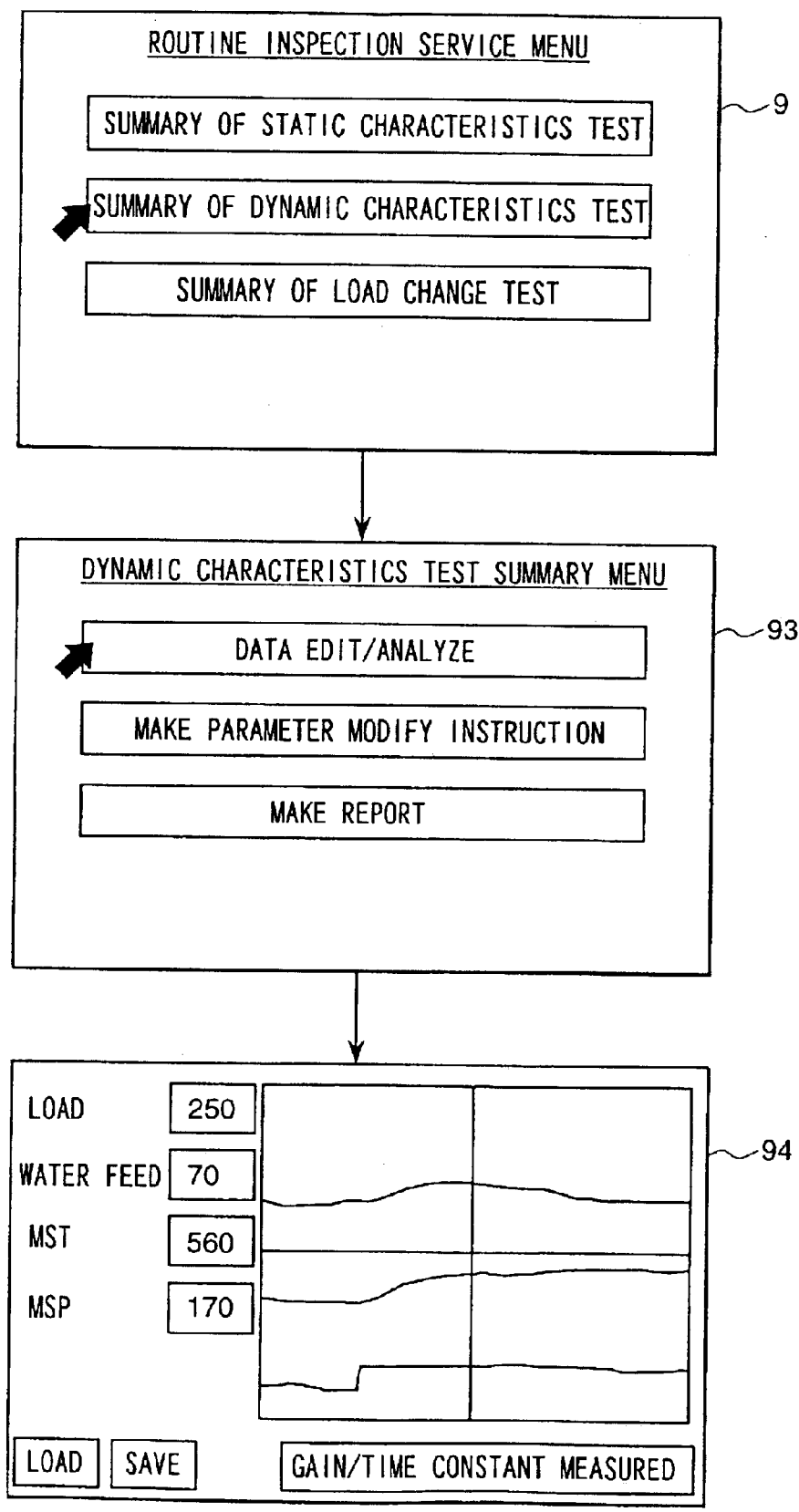
FIG. 6 is a diagram showing a sequence of examples of an operation display image for editing and analysis of dynamic characteristics test data of the invention.

FIG. 6 shows an exemplary sequence of operation display images used using dynamic characteristics test data edit and analysis processes at the remote maintenance device 3. When the operator selects an icon of "Dynamic Characteristics Test Summary" in the routine service menu display 9 being presently displayed on the display screen and then selects "Data Edit/Analysis" icon in a dynamic characteristics test summary menu display 93, a visual display 94 indicative of several data concerning the dynamic characteristics data edit/analysis is displayed on the screen. While viewing a test data trend graph included in this display image 94, s/he executes a task for summarization of material data items as to change-with-time properties of a main vapor temperature and main vapor pressure in case a constant amount of fuel is supplied.

Figure 7:
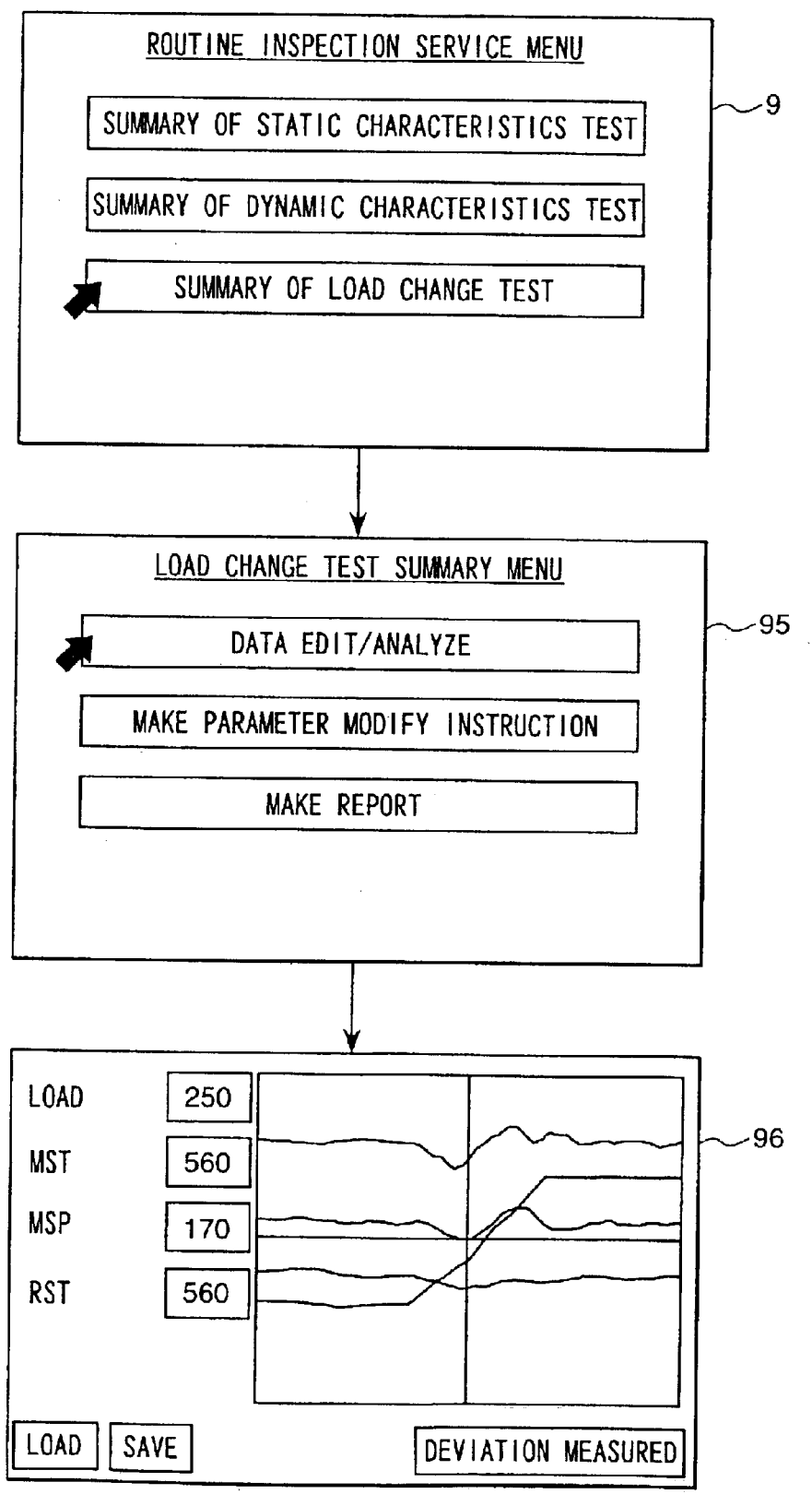
FIG. 7 is a diagram showing a sequence of exemplary operation display images for editing and analysis of load change test data of the invention.

FIG. 7 shows an exemplary sequence of operation display images used during load change test data edit and analysis processes at the remote maintenance device 3. When the operator selects an icon of "Load Change Test Summary" in the routine service menu display 9 and then selects "Data Edit/Analysis" in a load change test summary menu display 95, the screen changes to visually indicate an on-screen image 95 indicative of material data as to the load change test data edit and analysis. Using this visual display containing therein a test data trend graph, s/he summaries material data items as to deviation of the main vapor temperature and main vapor pressure during certain load change test procedure.

In case the maintenance service provider's test data analyzation executed in this way results in more than one control parameter being found to be modified or updated, s/he prepares control parameter modification instruction data at the remote maintenance device 3 for transmission to the maintenance tool 2 over the public communication line 8.

Figure 8:
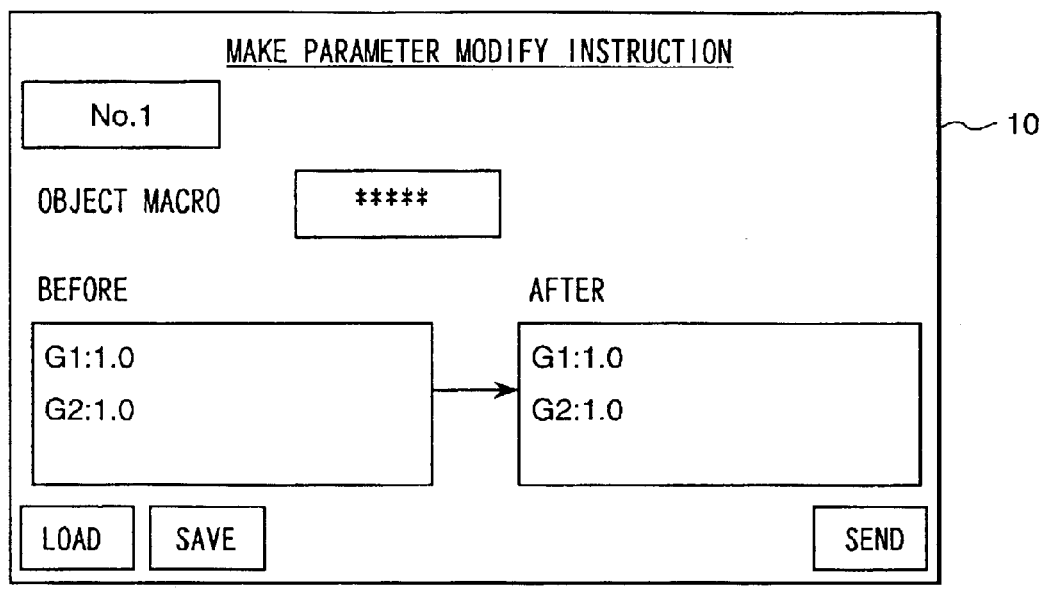
FIG. 8 is a diagram showing an exemplary operation display for preparation of control parameter change instruction data of the invention.

See FIG. 8 which depicts an exemplary on-screen operation display concerning preparation of the control parameter modification instruction data at the remote maintenance device 3. When the operator selects an icon of "Make Parameter Modify Instruction" in any one of the static characteristics summary menu display 91, dynamic characteristics summary menu 93 and load change test summary menu 95, the display screen changes to visually present a visual display 10 showing several data items used for preparation of a parameter modification/update instruction. Using this on-screen visual display, s/he inputs an operation macro with parameter update required and a present value thereof (a value as received from the maintenance tool 2 is displayed) along with a numerical value updated and then performs a transmission operation, causing the control parameter update instruction data to be sent forth toward the maintenance tool 2 over the public communication line 8. Upon receipt of the control parameter update instruction data, the maintenance tool 2 operates to visually display a control parameter update guidance in accordance with the content of such control parameter update instruction data on the screen of monitor 23 to thereby permit a worker who is responsible for facility adjustment at the power station to make use of the parameter online tuning function of the maintenance tool 2 to thereby rewrite via the transfer device 24 and unit network 7 in the online fashion the control parameter or parameters being presently stored in the memory of the controlling controller 11 in deference to the guidance displayed. Alternatively if the tuning is directly set up by a changeover switch or the like in the state of allowance then the maintenance tool 2 automatically operates to rewrite in online way such control parameter(s) in accordance with the contents of the control parameter update instruction data. In addition, after having analyzed the test data concerned, the maintenance service provider prepares at the remote maintenance device 3 a test report containing therein a data summary table and control parameter update history, which will then be sent forth to the maintenance tool 2 over the public communication line 8.

Figure 9:
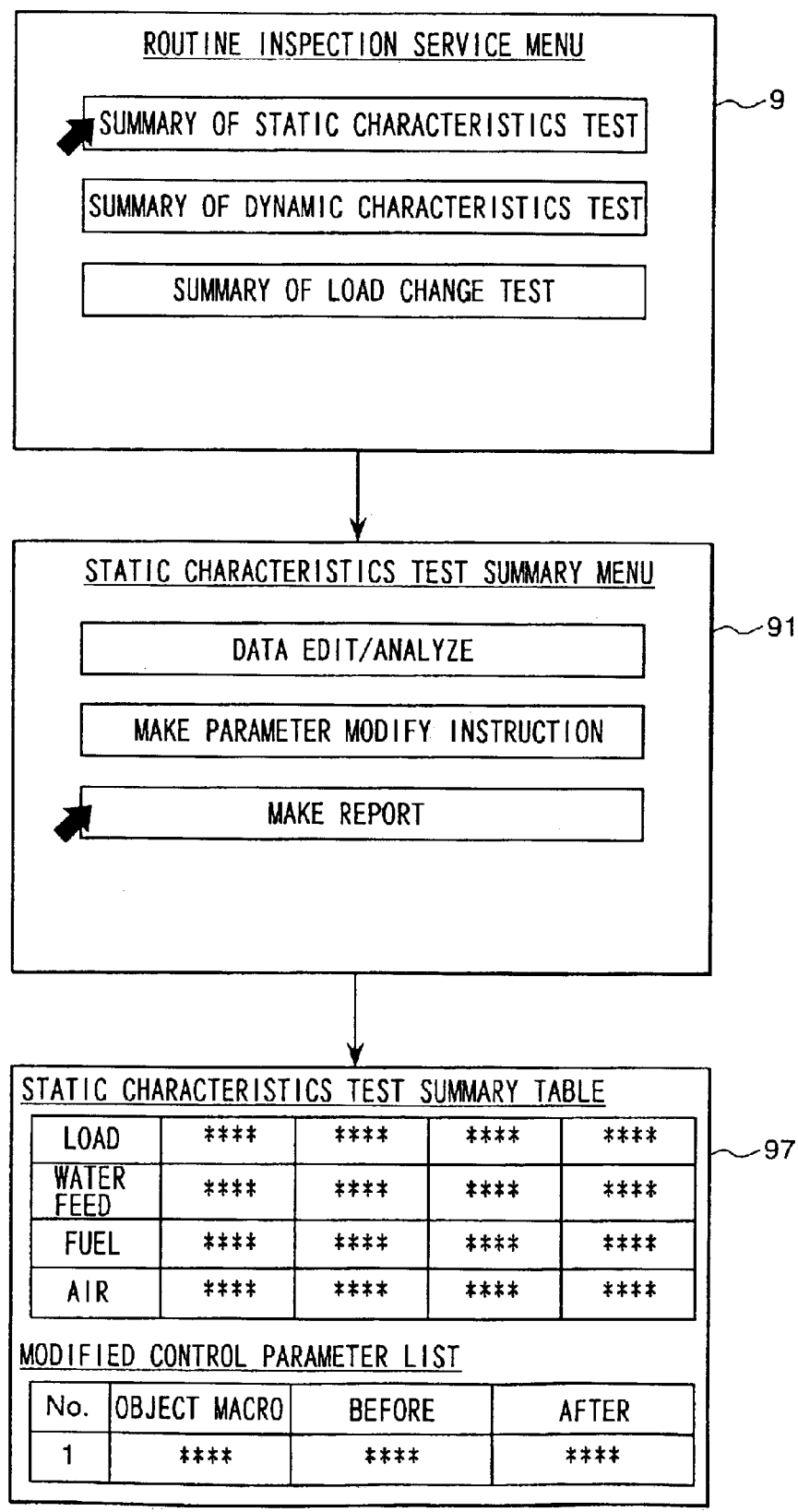
FIG. 9 is a diagram showing a sequence of some exemplary operation display images for preparation of static characteristics test report of the invention.

FIG. 9 shows an exemplary sequence of operation display images for use during preparation of a static characteristics test report at the remote maintenance device 3. When the operator selects "Static Characteristics Summary" icon in the routine service menu display 9 and then selects "Make Report" in the static characteristics summary menu display 91, then the screen changes to visually present a static characteristics test report preparation display 97. Using this on-screen display the maintenance service provider attempts to prepare a report of a prespecified format in which material data items such as the fuel amount, water feed amount, air amount and the like are summarized along with the resultant control parameter change/update history.

Figure 10:
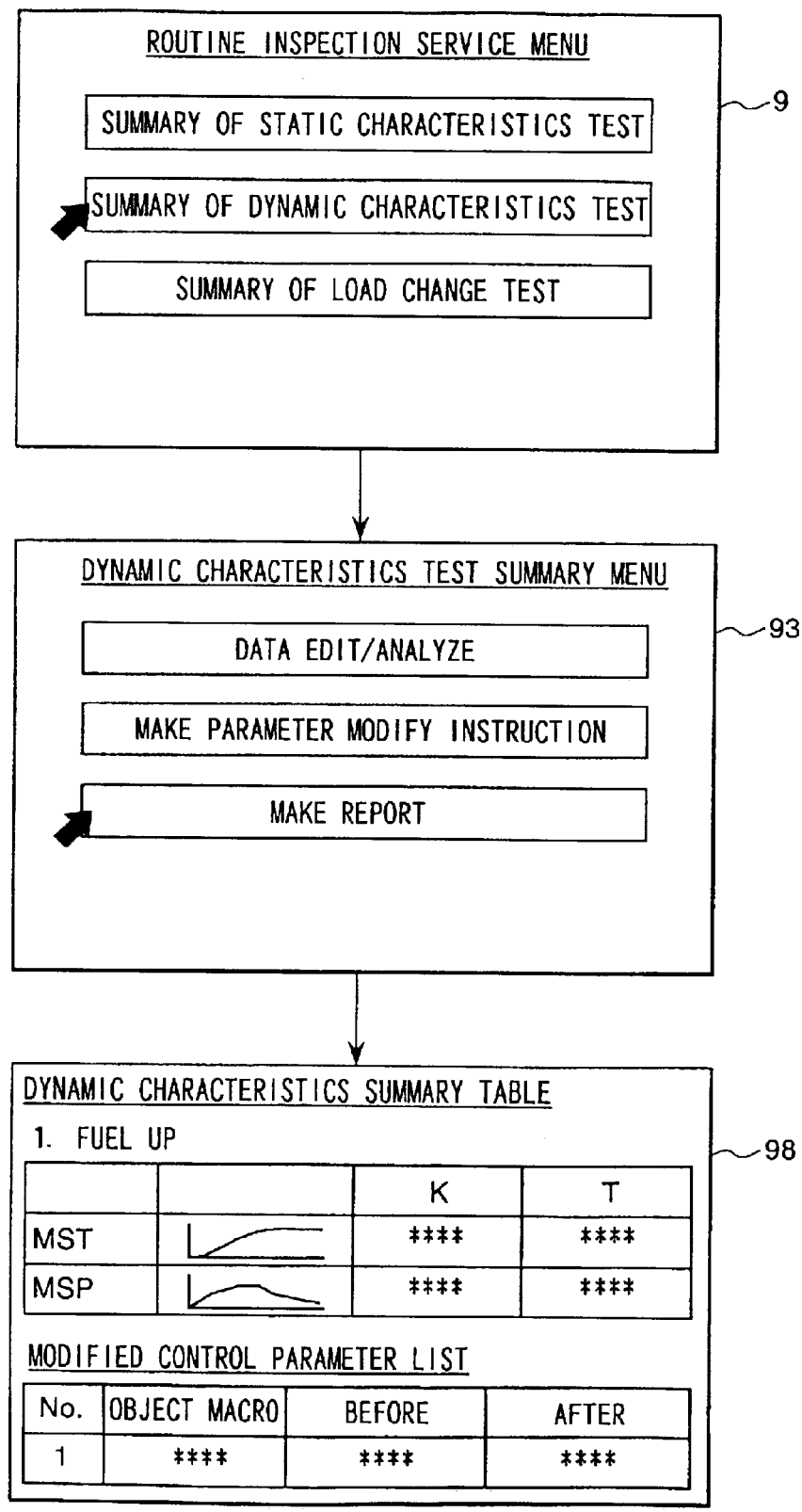
FIG. 10 is a diagram showing a sequence of exemplary operation display images for preparation of dynamic characteristics test report of the invention.

FIG. 10 shows an exemplary sequence of operation display image for preparation of a dynamic characteristics test report at the remote maintenance device 3. When the operator selects "Dynamic Characteristics Summary" icon in the routine service menu display 9 and then selects "Make Report" in the dynamic characteristics summary menu display 93, the screen changes to visually indicate a dynamic characteristics test report preparation display 98. Using this visual display the maintenance service provider prepares a report of a specified format in which material data items as summarized through editing and analysis of dynamic characteristics data such as for example variation properties or the like of the main vapor temperature and pressure in case the fuel amount is kept constant in value are indicated along with the resultant control parameter change/update history.

Figure 11:
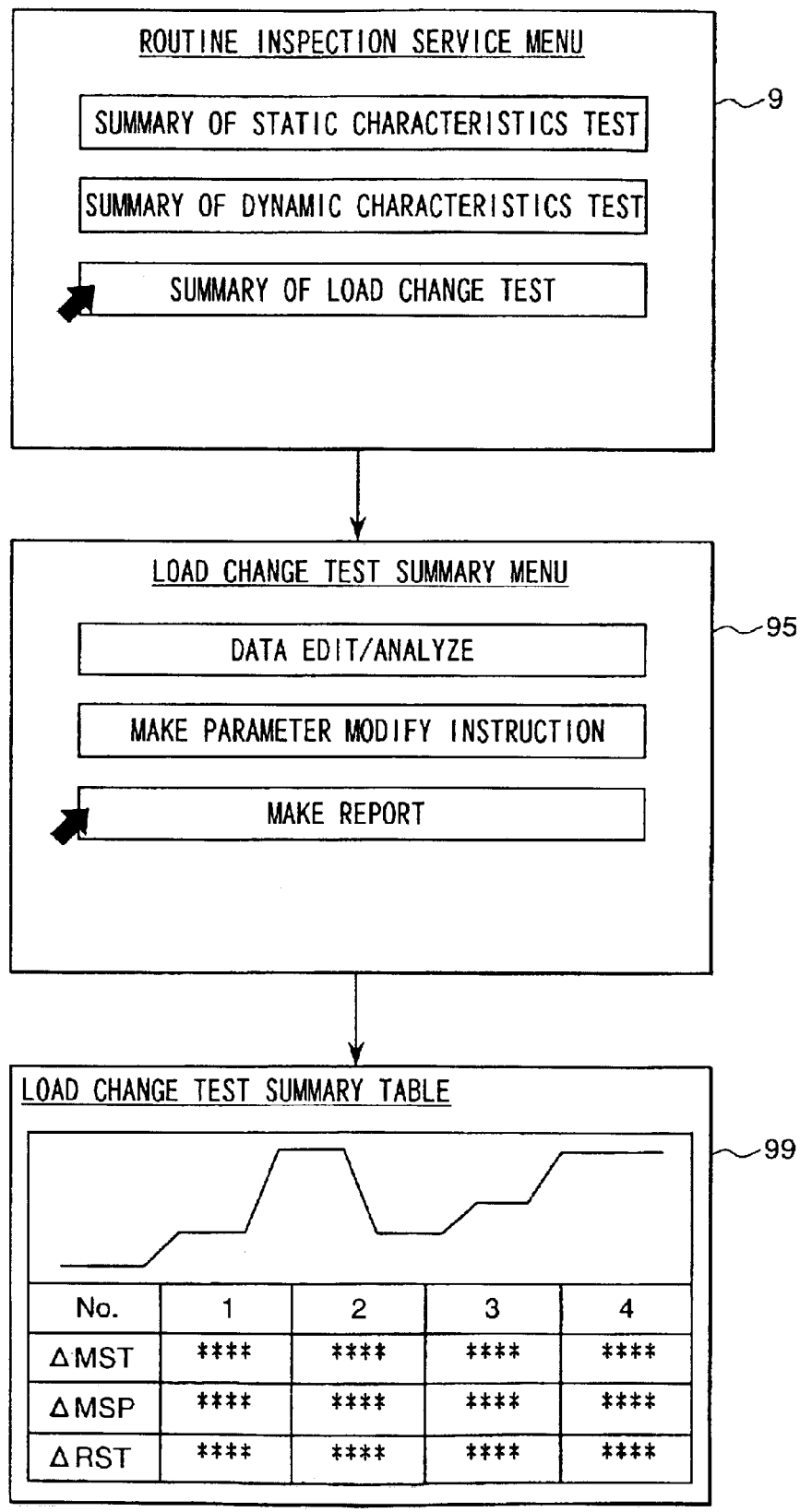
FIG. 11 is a diagram showing a sequence of exemplary operation displays for preparation of load change test report of the invention.

FIG. 11 shows an exemplary sequence of operation display images for preparation of a load change test report at the remote maintenance device 3. When the operator selects "Load Change Test Summary" icon in the routine service menu display 9 and then selects "Make Report" in the load change test summary menu display 95, the screen changes to visually indicate a load change test report preparation display 99. Using this visual display the maintenance service provider prepares a report of a specified format in which major data items as summarized through editing and analysis of load change test data such as for example variation properties or the like of the main vapor temperature and pressure during certain load change test procedure are indicated along with the resultant control parameter change/update history. At the maintenance tool 2, it performs hard copy production or printing tasks with or without saving the report data thus received.

An explanation will next be given of a method for providing a serve in the event that an operation failure or malfunction occurs at the controller-say, "controller abnormality event serve" in the description-as a second maintenance service example.

In the event that an operation failure or obstruction occurs at the control device 1 due to certain causes, it becomes difficult for the power plant to perform any intended operations. To avoid this, it should be required to promptly perform clarification of the cause of such obstruction creation for recovery required. In particular, the controlling controller 11 and PI/O device 13 and the like making up the control device 1 are inherently designed to employ highly precise electronics parts or components with complicated control operation programs being prestored in the memory of controlling controller 11; accordingly, upon occurrence of such obstruction, a need arises for technical support as to investigation by experienced engineers or specialists. The "controller abnormality event service" is such that in the case of occurrence of an obstruction at the control device 1, any required services typically including activities for inquiring into the cause(s) and giving an instruction as to an appropriate recovery method are done by a person who is expected to work as the maintenance service provider.

Figure 12:
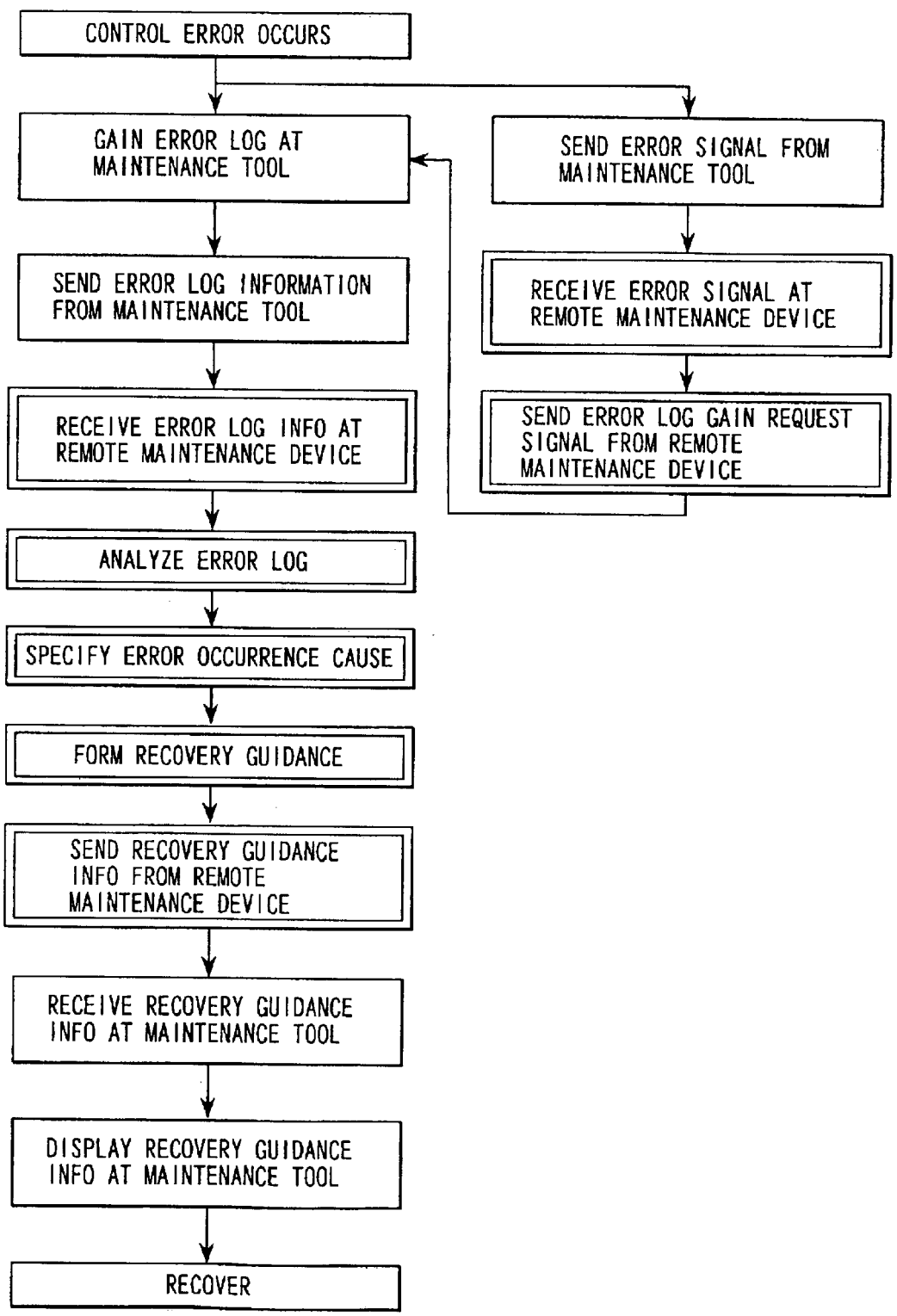
FIG. 12 is a flow diagram of a service upon occurrence of an operation failure in the controller of the invention.

See FIG. 12, which shows a process flow of such method for providing the "controller abnormality event service." In case an error occurs at the controlling controller 11, an operator will become aware of the generation of abnormality at the control device 1, by means of an alarm. And s/he uses the error log acquisition function of the maintenance tool 2 to gain error log information being presently saved within the controlling controller 11 via the unit network 7 and transfer device 24. Alternatively, in case an error occurs at the controlling controller 11, the maintenance tool 2 automatically operates to generate and issue a signal indicative of such error occurrence at the controlling controller 11 and then send forth this signal toward the remote maintenance device 3 via the communication device 22 and public communication line 8. Upon receipt of the error occurrence signal, the remote maintenance device 3 transmits an error log extraction request signal to the maintenance tool 2 via the communication device 32 and public communication line 8. When receiving this error log extract request signal the maintenance tool 2 acquires based on the error log extraction function the error log information being presently saved within the controlling controller 11 via the unit network 7 and transfer device 24. The error log information gained by any one of the above schemes will then be passed to the remote maintenance device 3 via the communication device 22 and public communication line 8. The maintenance service provider attempts to investigate the error log information as received by the remote maintenance device 3 for analyzation of an error cause(s)-that is, judging whether the presently occurring error is due to hardware malfunction or due to failures in control operation programs. Practical contents of the process flow of FIG. 12 will be explained in detail with reference to FIGS. 13–14 below.

Figure 13:
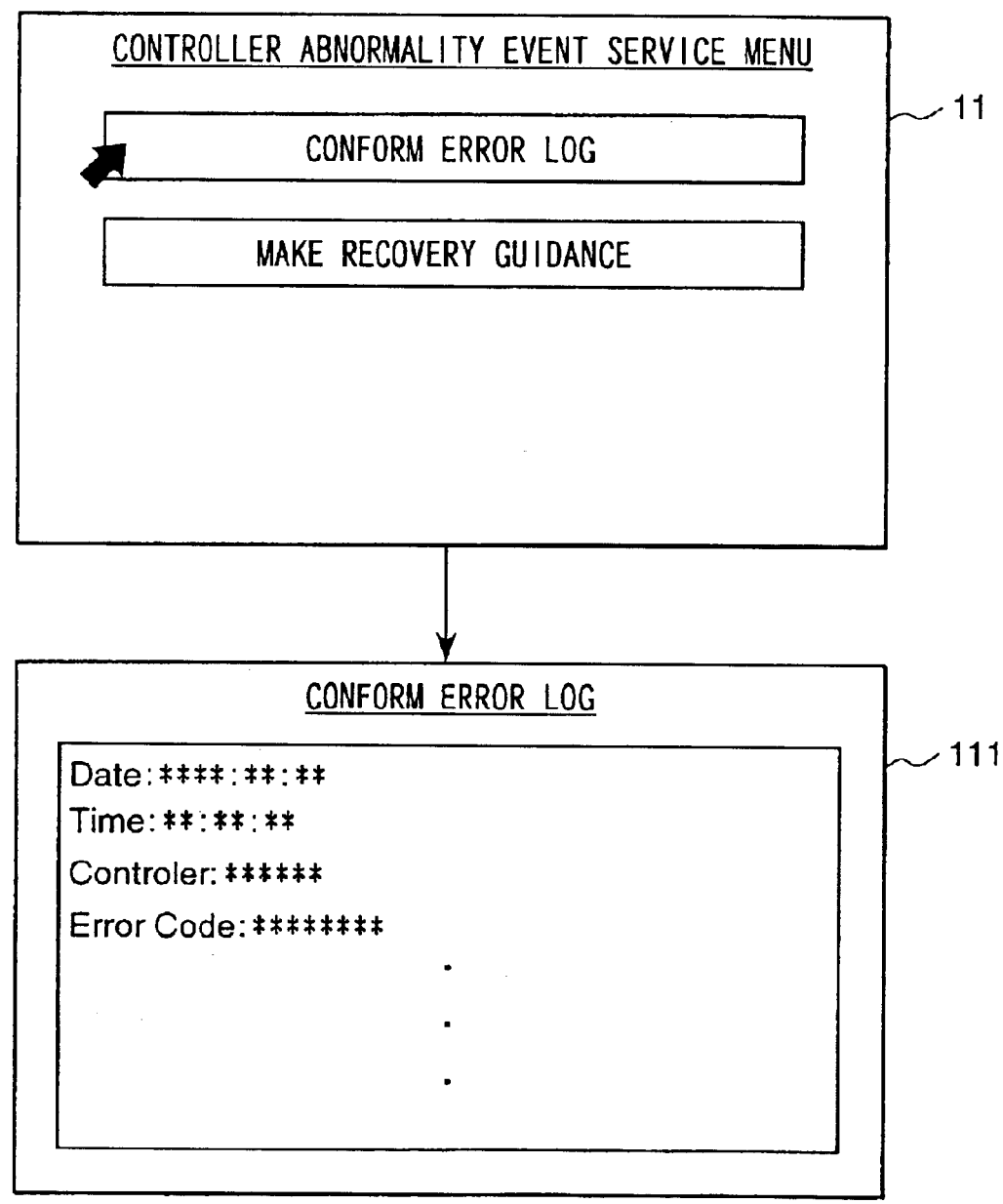
FIG. 13 is a diagram showing a sequence of exemplary operation display images for error log information research and analysis of the invention.

FIG. 13 shows an exemplary sequence of operation display images for use during error log information investigation/analyzation at the remote maintenance device 3. Upon selection of "Conform Error Log" icon in a controller abnormality event service menu display 11, the screen changes to visually indicate an error log confirmation display 111. It is thus possible for the maintenance service provider by viewing information displayed thereon to become aware of details of the error cause(s) and operation failed parts or components. After clarification of the error cause(s), the maintenance service provider prepares a recovery work guidance at the remote maintenance device 3, which guidance will then be sent to the maintenance tool 2 over the public communication line 8.

Figure 14:
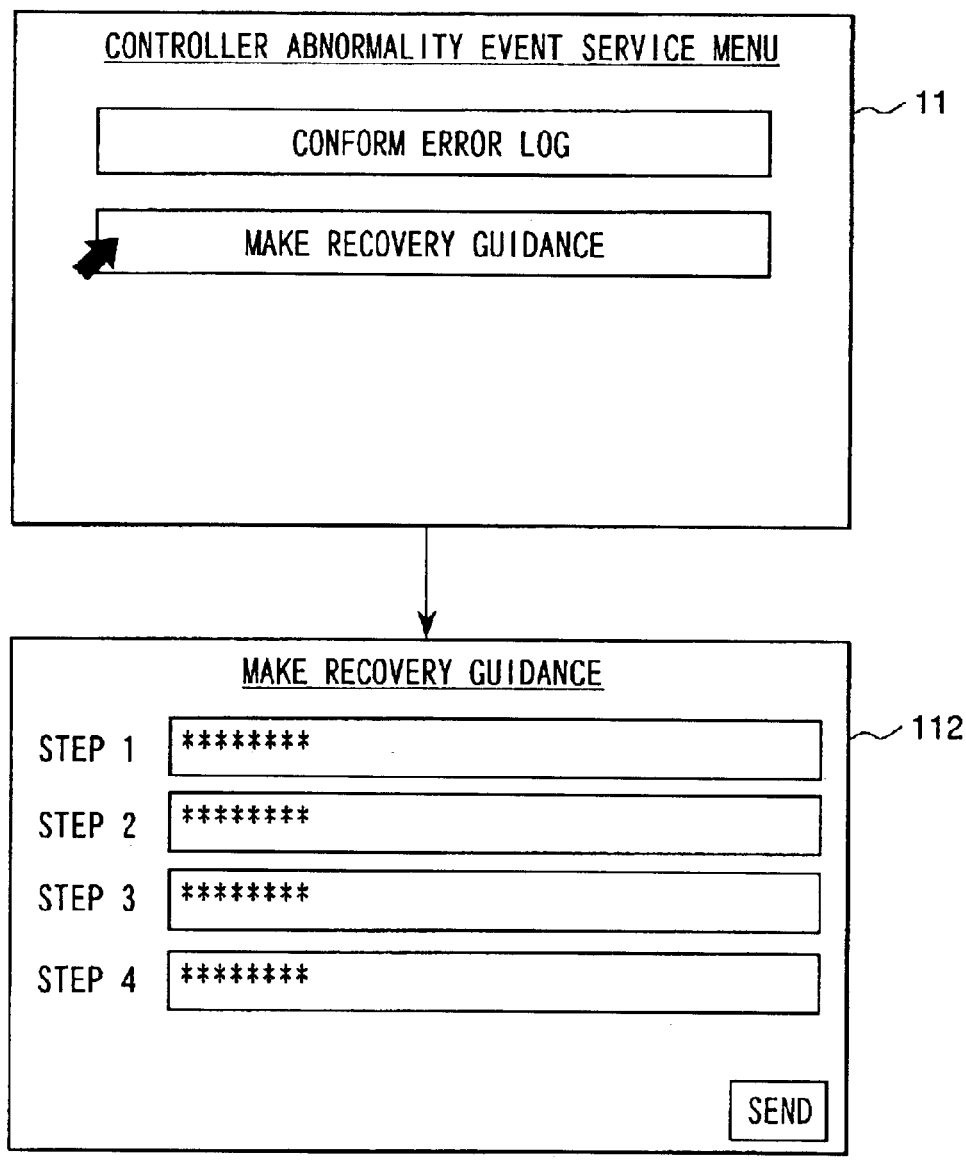
FIG. 14 is a diagram showing a sequence of exemplary operation displays for preparation of recovery work guidance data of the invention.

FIG. 14 shows an exemplary sequence of operation display images for use during recovery work guidance data preparation at the remote maintenance device 3. Upon selection of a "Make Recovery Guidance" icon in the controller abnormality event service menu display 11, the screen changes to visually indicate a recovery guidance preparation display 112. Here, the maintenance service provider prepares a recovery procedure document while performing a transmission operation to transmit the recovery work guidance data to the maintenance tool 2 over the public communication line 8. Upon receiving of the recovery work guidance data at the maintenance tool 2, recovery guidance information is visually displayed on the monitor 23 in accordance with the content of such recovery work guidance data, thus permitting more than one worker at the power station to execute required tasks for recovery in deference to the guidance.

Next, regarding a "control failure event service" as a practical example of a third maintenance service, its service provision method will be explained below.

In the power plant, unwanted control failures can take place from time to time during operation due to the presence of some mechanical factors and/or inappropriate control parameters, which would result for example in generation of an alarm when a vapor pressure or temperature goes out of its tolerance range or, alternatively, result in the plant status becoming unstable with an increase in difficulties of continuation of automatic control operations. In such cases, investigation for cause clarification is required along with equipment adjustment with or without adjusting the control parameters of the control device 1. The "control failure event service" is such that upon occurrence of a control failure or malfunction, the cause clarifying investigation and adjustment for improvement are to be remotely done by the maintenance service provider.

Figure 15:
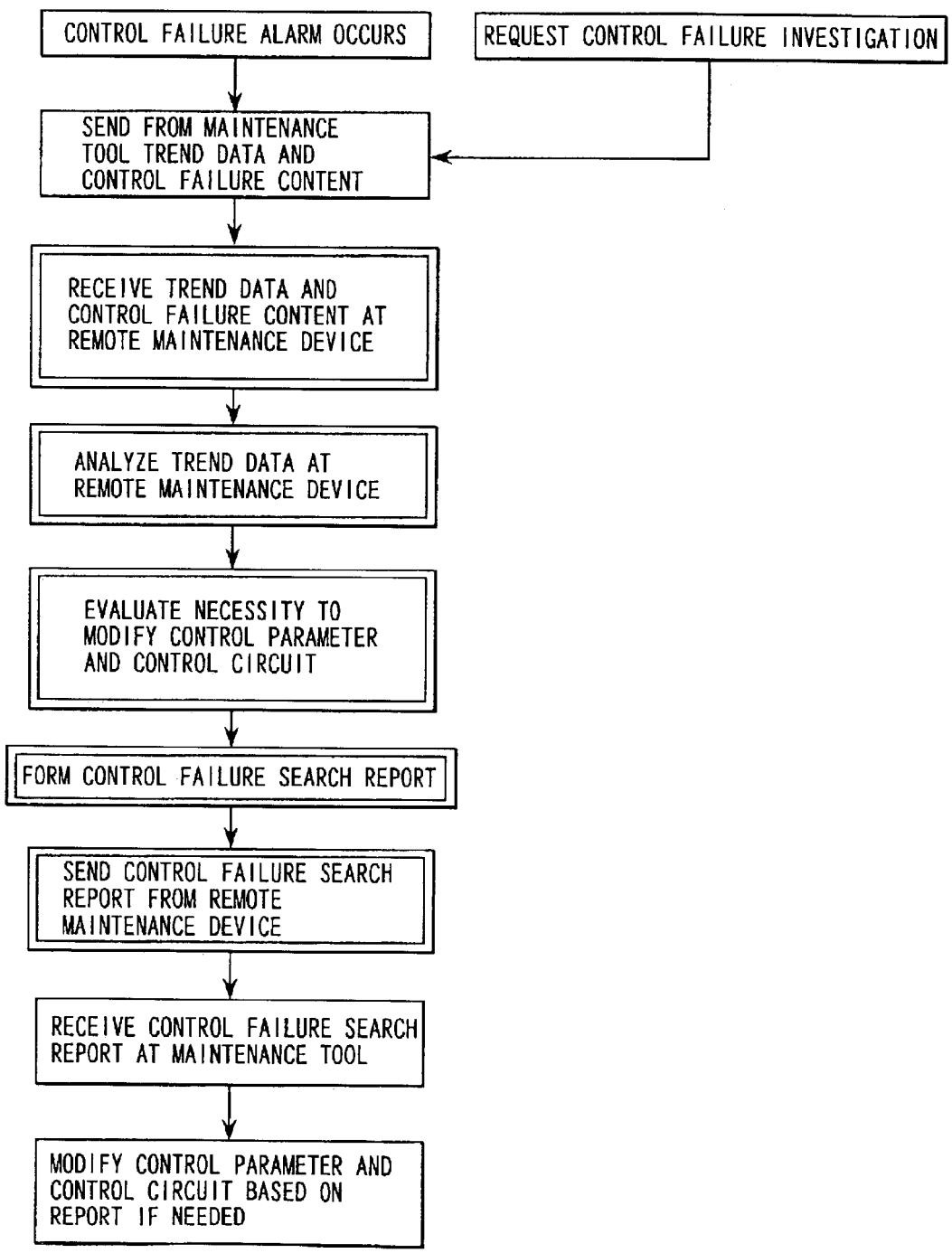
FIG. 15 is a flow diagram of a service in control failure events of the invention.

FIG. 15 shows a process flow of a method for providing such "control failure event service." Suppose that the vapor pressure or temperature goes out of the initially established allowance range during power plant operation. In this case, let material data—e.g. the content of an alarm along with process amount data (pressures and/or temperatures) and control signal data (operation end instruction values or else)—be transmitted from the maintenance tool 2 toward the remote maintenance device 3 over the public communication line 8. Alternatively an operator inputs a control failure search request at the maintenance tool 2 and then sends forth the control failure search request and its associated data to the remote maintenance device 3 via the public communication line 8. Practical contents of the process flow of FIG. 15 will be described with reference to FIGS. 16–18 below.

Figure 16:
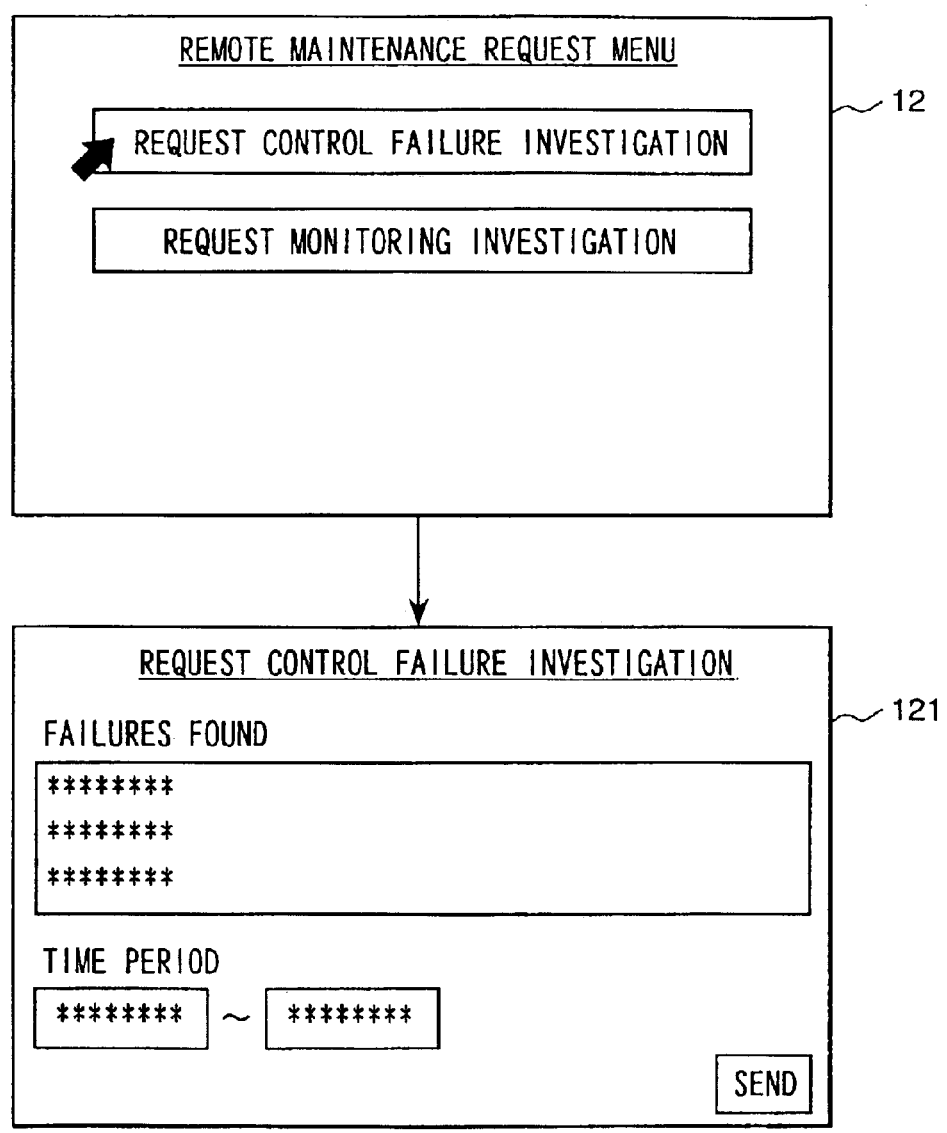
FIG. 16 is a diagram showing a sequence of exemplary operation displays for preparation of a control failure research request of the invention.

FIG. 16 shows an exemplary sequence of operation display images for use during preparation of a control failure search request at the maintenance tool 2. Upon selection of a "Request Control Failure Search" icon in a remote maintenance request menu display 12, the screen changes to visually indicate a control failure search request display 121. An operator working at the power station attempts to input information as to control failure contents and failure generation date and time or the like and then perform a data send operation, causing control failure search request data to be sent forth toward the remote maintenance device 3 via the public communication line 8. The maintenance service provider saves the received data and alarm content or control failure search request content in the memory device of the remote maintenance device 3, and then analyzes such saved data at the remote maintenance device 3.

Figure 17:
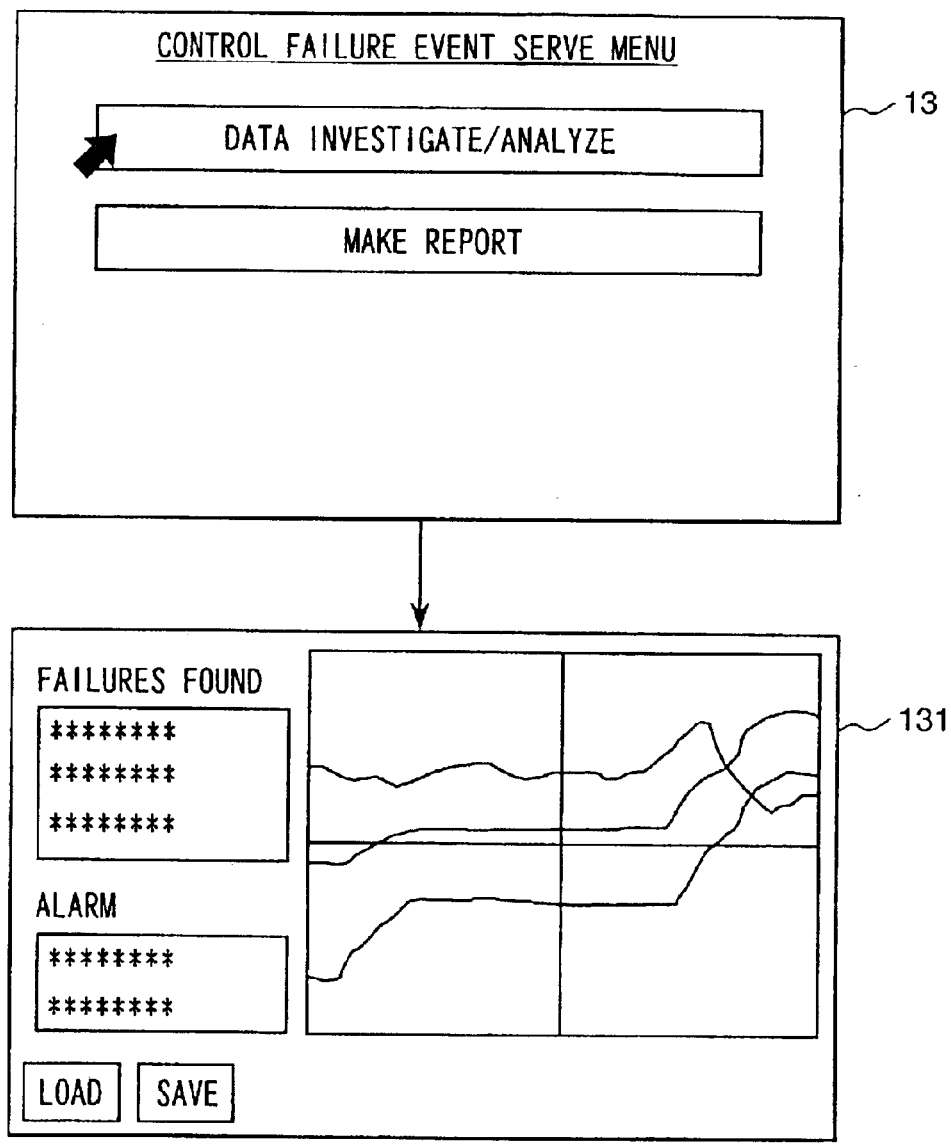
FIG. 17 is a diagram showing a sequence of exemplary operation displays for analysis of control failure event data of the invention.

FIG. 17 shows an exemplary sequence of major operation displays for use during analyzation of the control failure event data at the remote maintenance device 3. Upon selection of a "Data Search/Analyze" icon in a control failure event service menu display 13, the screen changes to visually indicate a control failure event data search/analyze display 131. With this on-screen visual display, the maintenance service provider commands to visualize a trend graph of the control failure event data as received from the maintenance tool 2 along with the control failure content and alarm content for analyzation of the control failure cause(s) and then careful consideration of an appropriate remedy to be taken. After completion of data analysis, the maintenance service provider remotely prepares at the remote maintenance device 3 a control failure search report that summarizes therein modification of a control parameter(s) or control circuitry and the control failure cause, which report is then sent to the maintenance tool 2 via the public communication line 8.

Figure 18:
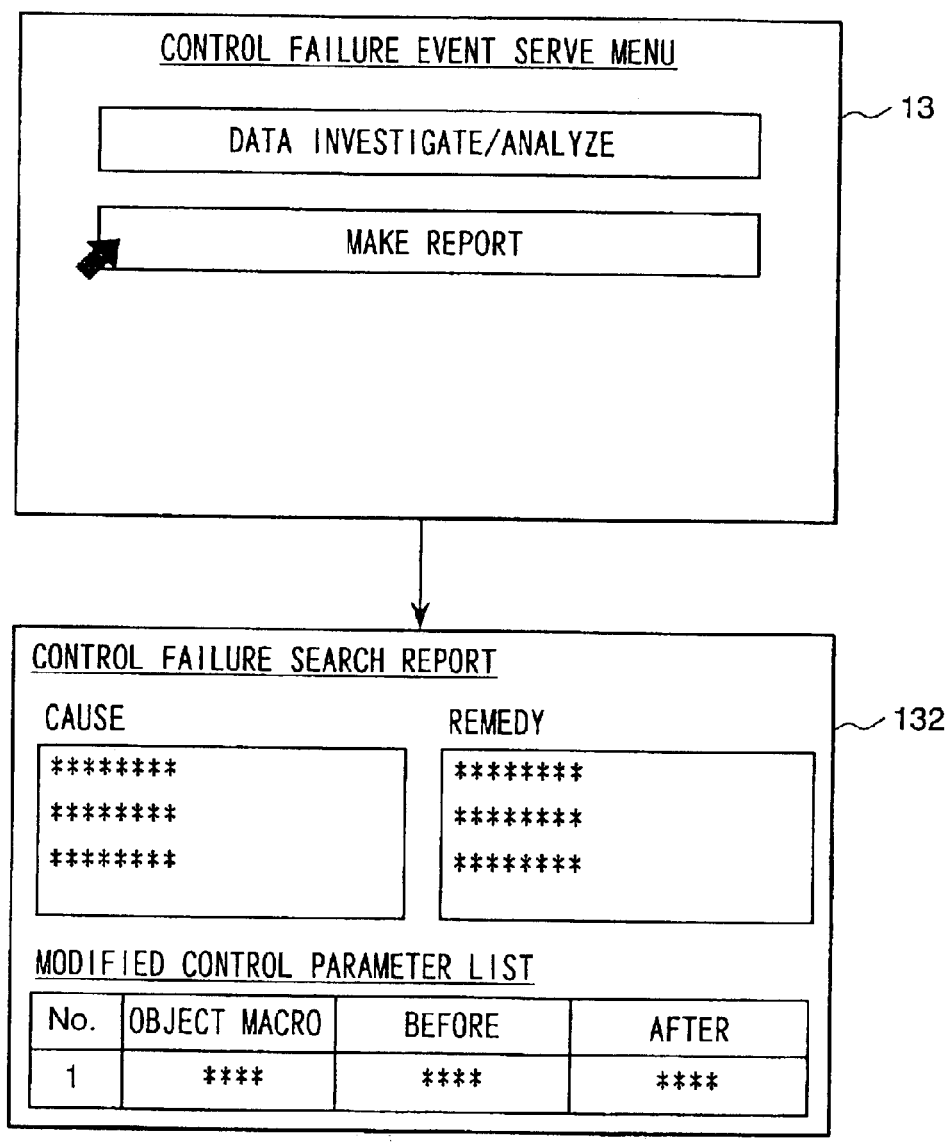
FIG. 18 is a diagram showing a sequence of exemplary an operation displays for preparation of a control failure search report of the invention.

FIG. 18 shows an exemplary sequence of operation display images for use during preparation of the control failure search report at the remote maintenance device 3. Upon selection of "Make Search Report" icon in the visual display of control failure event service menu 13, the screen changes to visually indicate a control failure search report preparation display 132. With this screen image, the maintenance service provider produces a report summarizing the control failure cause(s) and remedy plus updating of a control parameter(s) or control circuitry for improvement of such control failure. Upon receipt of the control failure search report at the maintenance tool 2, a guidance for updating the control parameter(s) or control circuitry is visually displayed on the screen of the monitor 23 in accordance with the updated content of the control parameter(s) or control circuitry as recited in the control failure search report, thus permitting an operator working at the power station to rewrite by use of the parameter online tuning function or control operation logic edit function of the maintenance tool 2 the object data being presently stored in the memory within the controlling controller 11 via the transfer device 24 and unit network 7 in deference to the presently displayed guidance. Alternatively, if the tuning is directly set by a changeover switch or the like to the state of allowance then the maintenance tool 2 automatically operates to rewrite in online way the object data in accordance with the updated content of the control parameter(s) or control circuitry. Additionally at the maintenance tool 2, it performs printing and/or saving tasks of the control failure search report data thus received.

Next, in regard to an "ordinary event service" as a practical example of a fourth maintenance service, its service provision method will be set forth below.

Upon start-up and shut-down of the power plant's functional units, the operation status must be monitored more carefully than in normal operation events due to the fact that startup and shutdown processes of a variety of types of facility equipment along with plant state variations overlap together. Additionally, in the case of coal combustion plants which are in the mainstream of thermal power plants in recent years, a change in kind of coal used as raw fuel material can result in a significant change in burning or combustion state depending on coal's components and properties, which would affect the plant operation in a various ways. Other factors affecting the operation include age changes of a plant per se. Although these are not always regarded as operation failures or malfunctions, they call for adjustment of control systems on a case-by-case basis. The "ordinary event service" is such that in cases where operation state monitor or "watchdog" is especially required such as in the events of startup of the units involved, operation interruption or "shutdown," coal kind change, and change with age, monitoring and evaluation are remotely done by an operator who is expected to act as the maintenance service provider.

Figure 19:
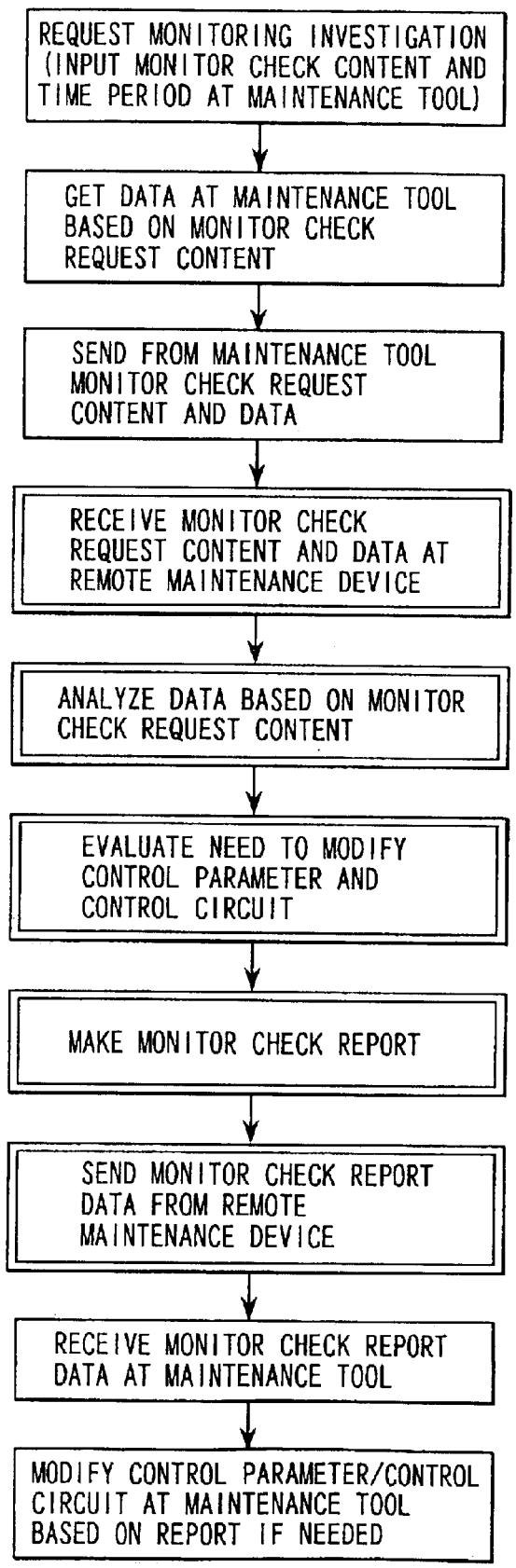
FIG. 19 is a flow diagram of an ordinary event service of the invention.

FIG. 19 shows a process flow of a method for providing the "ordinary event service." In case an operator in a power station judges that the maintenance service provider's plant operation monitoring and control system evaluation is necessary due to the unit operation startup, shutdown, coal kind change and change with age, s/he inputs a monitor search request at the maintenance tool 2. Practical contents of the process flow of FIG. 19 will be explained with reference to FIGS. 20–22 below.

Figure 20:
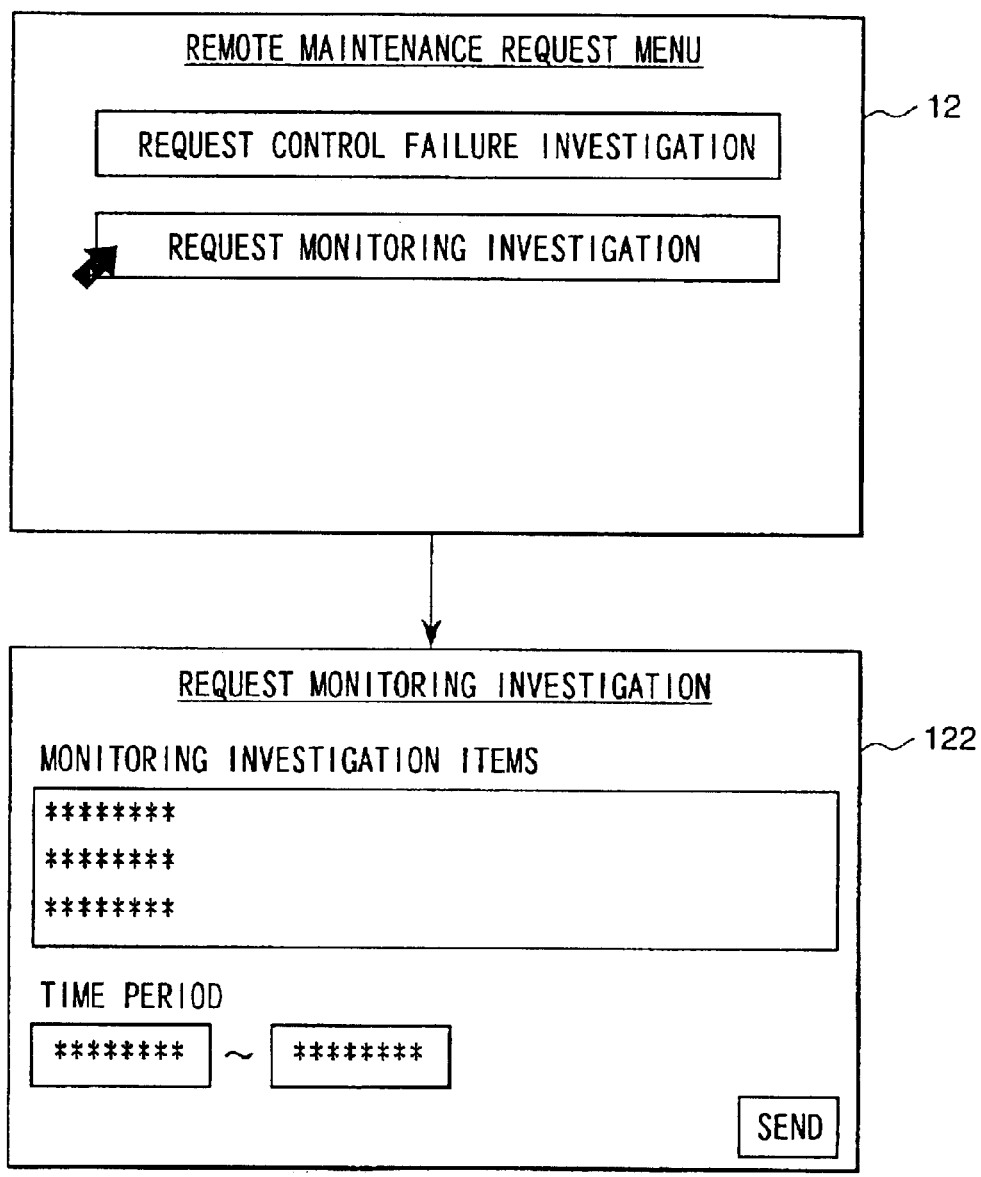
FIG. 20 is a diagram showing a sequence of exemplary operation displays for preparation of a monitor search request of the invention.

FIG. 20 shows a sequence of exemplary operation display images for preparation of such monitor search request at the maintenance tool 2. Upon selection of an icon of "Request Monitor Search" in the visual display of the remote maintenance request menu 12, the screen changes to visually indicate a monitor search request display 122. The power station operator inputs information including a monitor search content and monitor search period and others and then performs data send operations thus causing the monitor search request data to be sent forth toward the remote maintenance device 3 via the public communication line 8. The maintenance tool 2 acquires process amount data (pressures and temperatures) and control signal data (operation end instruction values) in accordance with the content of such monitor search request and then transmits the data to the remote maintenance device 3 over the public communication line 8. In responding thereto, the maintenance service provider saves the received data and the monitor search request content in the memory device of the remote maintenance device 3 for analyzation of such saved data at the remote maintenance device 3.

Figure 21:
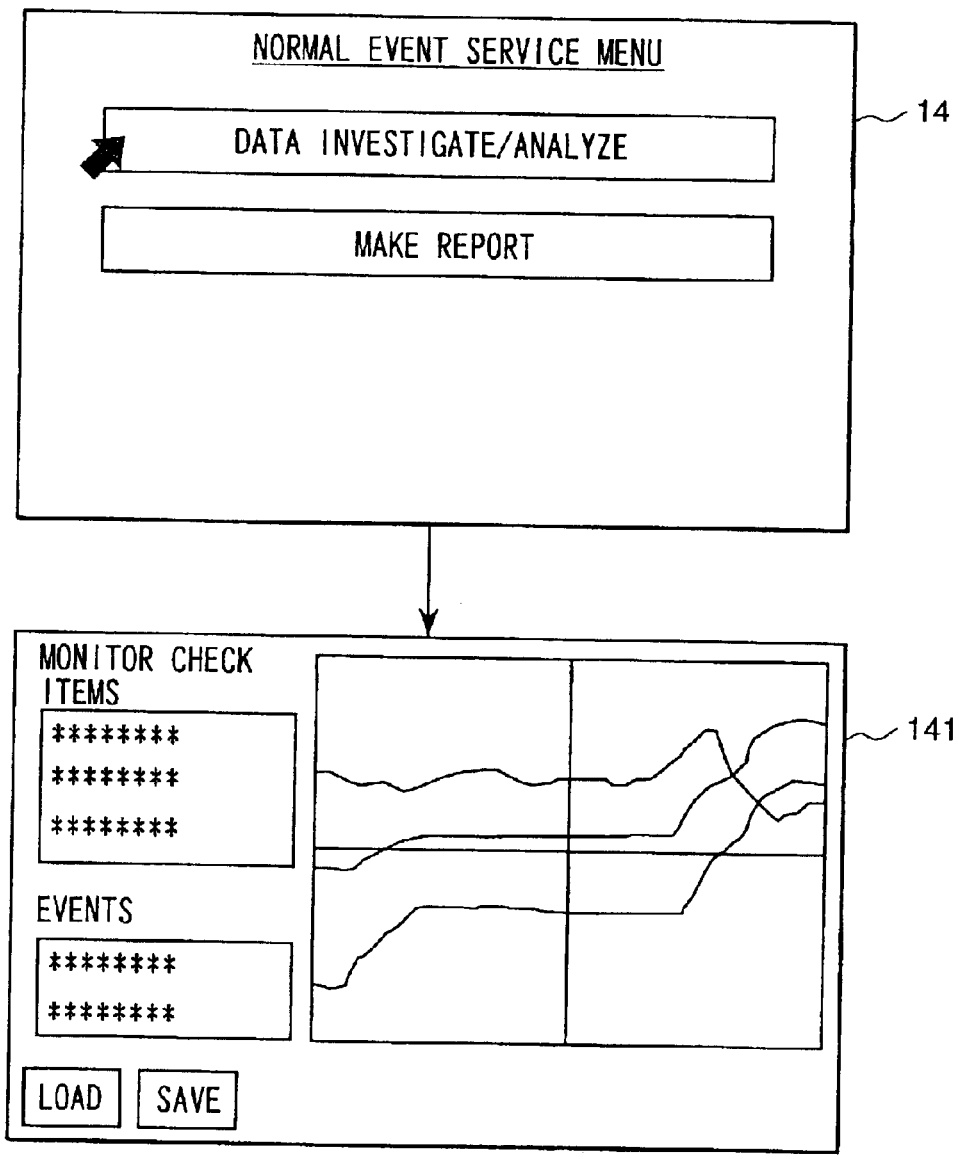
FIG. 21 is a diagram showing a sequence of exemplary operation displays for analysis of data in ordinary event data of the invention.

FIG. 21 shows a sequence of exemplary operation display images for analysis of the ordinary event data at the remote maintenance device 3. When selecting "Data Search/Analyze" icon in the visual display of ordinary event service menu 14, the screen changes to present ordinary event data search/analysis display 141. With this visual display, the maintenance service provider commands to display a trend graph of the data as received from the maintenance tool 2 along with the monitor search content and the like, then evaluates the data, and then investigates for determination of whether a need arises to modify or update the control parameter(s) or control circuitry. After having analyzed the data, the maintenance service provider prepares at the remote maintenance device 3 a monitor search report which summarizes therein data evaluation results and, if necessary, modified control parameter(s) or control circuitry along with the ground(s) thereof, then s/he sends the report to the maintenance tool 2 via the public communication line 8.

Figure 22:
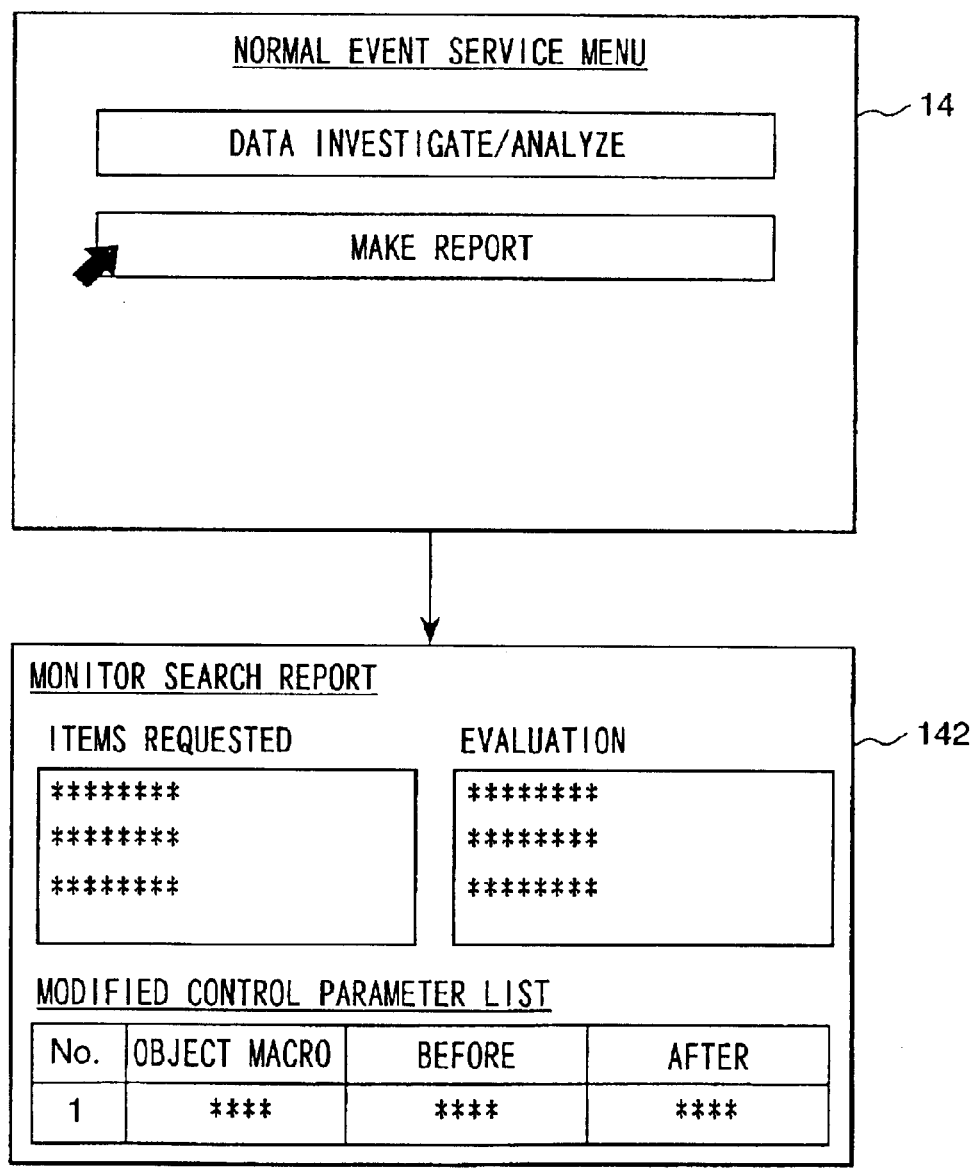
FIG. 22 is a diagram showing a sequence of exemplary operation displays for preparation of a monitor search report of the invention.

FIG. 22 shows a sequence of exemplary operation display images for preparation of the monitor search report at the remote maintenance device 3. Upon selecting of "Form Report" icon in the ordinary event service menu display 14, the screen changes to visually indicate a monitor search report preparation display 142. With this image, the maintenance service provider prepares his or her report summarizing therein monitor search contents and evaluation results thereof plus a control parameter change(s) or control circuitry change(s) in case such is judged to be necessary. At the maintenance tool 2, upon receipt of the monitor search report, a guidance for updating a control parameter(s) or control circuit(s) is visually displayed on the screen of monitor 23 in accordance with the control parameter/circuit change content as recited in the monitor search report, thus permitting an operator in the power station to rewrite using the parameter online tuning function or control operation logic edit function of the maintenance tool 2 the object data being presently stored in the memory within the controlling controller 11 via the transfer device 24 and unit network 7 in deference to the presently displayed guidance. Alternatively, if the tuning is directly set by a changeover switch or the like to the state of allowance then the maintenance tool 2 automatically operates to rewrite in online way the object data in accordance with the update contents of the control parameter(s) or control circuitry. In addition, at the maintenance tool 2, it performs printing and/or saving tasks of the monitor search report data thus received.

It has been described that with the illustrative embodiment, it is possible to promptly provide adequate maintenance services at low costs in routine inspection events and also in abnormality occurrence events thus improving the quality of maintenance services because of the fact that as far as the maintenance service provider is linked by communications lines with the maintenance tool in a power station, the use of a remote maintenance device offering similar executable functions to those of the maintenance tool makes it possible to provide from a remote cite various maintenance services including but not limited to test data summarization and evaluation results during routine inspection procedures and/or search and investigation results in abnormality occurrence events.

What is claimed:

1. A thermal power plant maintenance service provision method for use with a thermal power plant maintenance system comprising a control device for control of an operation state and process amount of plant equipment and a maintenance tool operatively coupled via a network to said control device for performing maintenance of a controlling controller as built in said control device, characterized in that the system further comprises a remote maintenance device for executing a similar function to that of said maintenance tool, and that the method provides a thermal power plant maintenance service for permitting bidirectional transmission of plant data and data concerning a state of said controlling controller via said communication line between said maintenance tool and said remote maintenance device, and a maintenance service providing person directly modifies more than one control parameter or control circuitry within said controlling controller via said communication line and said maintenance tool and said network.

2. The thermal power plant maintenance service provision method as recited in claim 1, characterized by providing a maintenance service wherein upon occurrence of an obstruction at said controlling controller said remote maintenance device receives error log information of said controlling controller from said maintenance tool via said communication line, wherein a maintenance service providing person analyzes said error log information at said remote maintenance device to thereby prepare an obstruction recovery procedure, and wherein data of said obstruction recovery procedure is sent toward said maintenance tool via said communication line to thereby visually display said obstruction recovery procedure on a monitor of said maintenance tool.

3. The thermal power plant maintenance service provision method as recited in claim 2, characterized by providing a maintenance service wherein upon occurrence of an obstruction at said controlling controller said remote maintenance device receives from said maintenance tool via said communication line a signal indicative of occurrence of the obstruction at said controlling controller, wherein an error log acquisition request signal of said controlling controller is sent to said maintenance tool via said communication line, and wherein upon receipt of said error log acquisition request signal said maintenance tool is operable to automatically acquire the error log information of said controlling controller.

4. The thermal power plant maintenance service provision method as recited in claim 1, characterized by providing a maintenance service wherein during routine inspection of a thermal power plant said remote maintenance device is operable to receive test data from said maintenance tool via said communication line, wherein the maintenance service providing person edits, evaluates and prepares a control parameter update history for said test data at said remote maintenance device to thereby prepare a report, and wherein data of said report is sent toward said maintenance tool via said communication line.

5. The thermal power plant maintenance service provision method as recited in claim 1, characterized by providing a maintenance service wherein upon occurrence of an alarm due to plant control abnormality or upon issuance of a control failure search request through manipulation of said maintenance tool said remote maintenance device receives plant data from said maintenance tool via said communication line, wherein a maintenance service providing person analyzes and evaluates said plant data at said remote maintenance device for preparation of a report, and wherein data of said report is sent to said maintenance tool via said communication line.

6. The thermal power plant maintenance service providing method as recited in claim 1, characterized by providing a maintenance service wherein upon issuance of a plant operation monitor search request through manipulation of said maintenance tool said remote maintenance device receives plant data from said maintenance tool via said communication line, wherein a maintenance service providing person analyzes and evaluates said plant data at said remote maintenance device to thereby prepare a report, and wherein data of said report is sent to said maintenance tool via said communication line.

7. The thermal power plant maintenance service provision method as recited in claim 1, characterized by providing a maintenance service wherein upon occurrence of an obstruction at said controlling controller said remote maintenance device receives from said maintenance tool via said communication line a signal indicative of occurrence of the obstruction at said controlling controller, wherein an error log acquisition request signal of said controlling controller is sent to said maintenance tool via said communication line, and wherein upon receipt of said error log acquisition request signal said maintenance tool is operable to automatically acquire the error log information of said controlling controller.

8. A thermal power plant maintenance service provision method for use with a thermal power plant maintenance system comprising a control device for control of an operation state and process amount of plant equipment and a maintenance tool operatively coupled via a network to said control device for performing maintenance of a controlling controller as build in said control device, characterized in that the system further comprises a remote maintenance device for executing a similar function to that of said maintenance tool, wherein the control parameter or control circuitry of said controlling controller is revised through said communication line, said maintenance tool, and said network according to the data of the revision instruction transmitted from said remote maintenance device.

9. The thermal power plant maintenance service provision method as recited in claim 8, characterized by providing a maintenance service wherein said remote maintenance device transmits the report data that describes said revision of the control parameter or control circuitry to said maintenance tool via said communication line.

10. A thermal power plant maintenance service provision method for use with a thermal power plant maintenance system comprising a control device for control of an operation state and process amount of plant equipment and a maintenance tool operatively coupled via a network to said control device for performing maintenance of a controlling controller as built in said control device, characterized in that the system further comprises a remote maintenance device for executing a similar function to that of said maintenance tool, and that the method provides a thermal power plant maintenance service for permitting bidirectional transmission of plant data and data concerning a state of said controlling controller via said communication line between said maintenance tool and said remote maintenance device, and providing a maintenance service wherein during routine inspection of a thermal power plant said remote maintenance device is operable to receive test data from said maintenance tool via said communication line, wherein a maintenance service providing person edits, evaluates and prepares a control parameter update history for said test data at said remote maintenance device to thereby prepare a report, and wherein data of said report is sent toward said maintenance tool via said communication line.

* * * * *